(12) United States Patent
Kitada et al.

(10) Patent No.: US 11,906,717 B2
(45) Date of Patent: Feb. 20, 2024

(54) ZOOM LENS SYSTEM, AND IMAGE CAPTURE DEVICE AND INTERCHANGEABLE LENS UNIT INCLUDING THE ZOOM LENS SYSTEM

(71) Applicant: Panasonic Intellectual Property Management Co., Ltd., Osaka (JP)

(72) Inventors: Takahiro Kitada, Osaka (JP); Takehiro Nishioka, Nara (JP); Yoshio Matsumura, Osaka (JP); Takakazu Bito, Osaka (JP); Kunio Dohno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 103 days.

(21) Appl. No.: 17/673,017

(22) Filed: Feb. 16, 2022

(65) Prior Publication Data

US 2022/0260814 A1 Aug. 18, 2022

(30) Foreign Application Priority Data

Feb. 17, 2021 (JP) ................................. 2021-023038
Feb. 17, 2021 (JP) ................................. 2021-023041

(51) Int. Cl.
*G02B 15/14* (2006.01)
*G02B 7/10* (2021.01)
*G02B 7/14* (2021.01)

(52) U.S. Cl.
CPC ........... *G02B 15/1461* (2019.08); *G02B 7/10* (2013.01); *G02B 7/14* (2013.01)

(58) Field of Classification Search
CPC ......... G02B 15/1461; G02B 7/10; G02B 7/14
See application file for complete search history.

(56) References Cited

U.S. PATENT DOCUMENTS

| | | | |
|---|---|---|---|
| 2010/0284092 A1 | 11/2010 | Hayakawa | |
| 2012/0075494 A1* | 3/2012 | Katayose | ....... G02B 15/143105 348/222.1 |
| 2019/0025560 A1 | 1/2019 | Okuoka | |

FOREIGN PATENT DOCUMENTS

| | | |
|---|---|---|
| JP | 11-174324 | 7/1999 |
| JP | 2009-180844 | 8/2009 |
| JP | 2012-63432 | 3/2012 |
| JP | 2014-145801 | 8/2014 |
| JP | 2014-228734 | 12/2014 |
| JP | 2019-20679 | 2/2019 |

* cited by examiner

*Primary Examiner* — James C. Jones
(74) *Attorney, Agent, or Firm* — Wenderoth, Lind & Ponack, L.L.P.

(57) ABSTRACT

A zoom lens system includes at least six lens groups, each of which has power. An interval between each pair of lens groups that are adjacent to each other among the at least six lens groups changes while the zoom lens system is zooming. Each of three lens groups, which are respectively located closest, second closest, and third closest to an image plane, out of the at least six lens groups consists of one or more bonded lenses.

13 Claims, 17 Drawing Sheets

ZOOM LENS SYSTEM, AND IMAGE CAPTURE DEVICE AND INTERCHANGEABLE LENS UNIT INCLUDING THE ZOOM LENS SYSTEM

CROSS-REFERENCE TO RELATED APPLICATIONS

The present application is based upon, and claims the benefit of priority to, Japanese Patent Application No. 2021-023038 filed on Feb. 17, 2021, and Japanese Patent Application No. 2021-023041 filed on Feb. 17, 2021, the entire disclosures of which are hereby incorporated by reference.

TECHNICAL FIELD

The present disclosure relates to a zoom lens system including at least six lens groups, and also relates to an image capture device and interchangeable lens system including such a zoom lens system.

BACKGROUND ART

JP 2019-020679 A discloses a zoom lens system including: a first lens group having positive refractive power; a second lens group having negative refractive power; a third lens group having positive refractive power; a fourth lens group having positive refractive power; a fifth lens group having negative refractive power, a sixth lens group having positive refractive power, and a seventh lens group having negative refractive power, where these first through seventh lens groups are arranged in this order such that the first lens group is located closer to an object than any other lens group is and that the seventh lens group is located closer to an image plane than any other lens group is.

SUMMARY

The present disclosure provides a zoom lens system in which various types of aberrations have been compensated for sufficiently over the entire zoom range, and also provides an image capture device and interchangeable lens system including such a zoom lens system.

A zoom lens system according to an aspect of the present disclosure includes at least six lens groups, each of which has power. An interval between each pair of lens groups that are adjacent to each other among the at least six lens groups changes while the zoom lens system is zooming. Each of three lens groups, which are respectively located closest, second closest, and third closest to an image plane, out of the at least six lens groups consists of one or more bonded lenses.

An image capture device according to another aspect of the present disclosure may transform an optical image of an object into an electrical image signal and output the electrical image signal thus transformed. The image capture device includes: a zoom lens system to form the optical image of the object; and an image sensor to transform the optical image formed by the zoom lens system into the electrical image signal. The zoom lens system includes at least six lens groups, each of which has power. An interval between each pair of lens groups that are adjacent to each other among the at least six lens groups changes while the zoom lens system is zooming. Each of three lens groups, which are respectively located closest, second closest, and third closest to an image plane, out of the at least six lens groups consists of one or more bonded lenses.

An interchangeable lens unit according to still another aspect of the present disclosure is removably connected, via a mount, to a camera body. The camera body includes: an image sensor to receive an optical image and transform the optical image into an electrical image signal; and the mount. The interchangeable lens unit includes at least six lens groups, each of which has power. An interval between each pair of lens groups that are adjacent to each other among the at least six lens groups changes while the interchangeable lens unit is zooming. Each of three lens groups, which are respectively located closest, second closest, and third closest to an image plane, out of the at least six lens groups consists of one or more bonded lenses.

BRIEF DESCRIPTION OF DRAWINGS

The figures depict one or more implementations in accordance with the present teaching, by way of example only, not by way of limitations. In the figures, like reference numerals refer to the same or similar elements.

DETAILED DESCRIPTION

Figure 1:
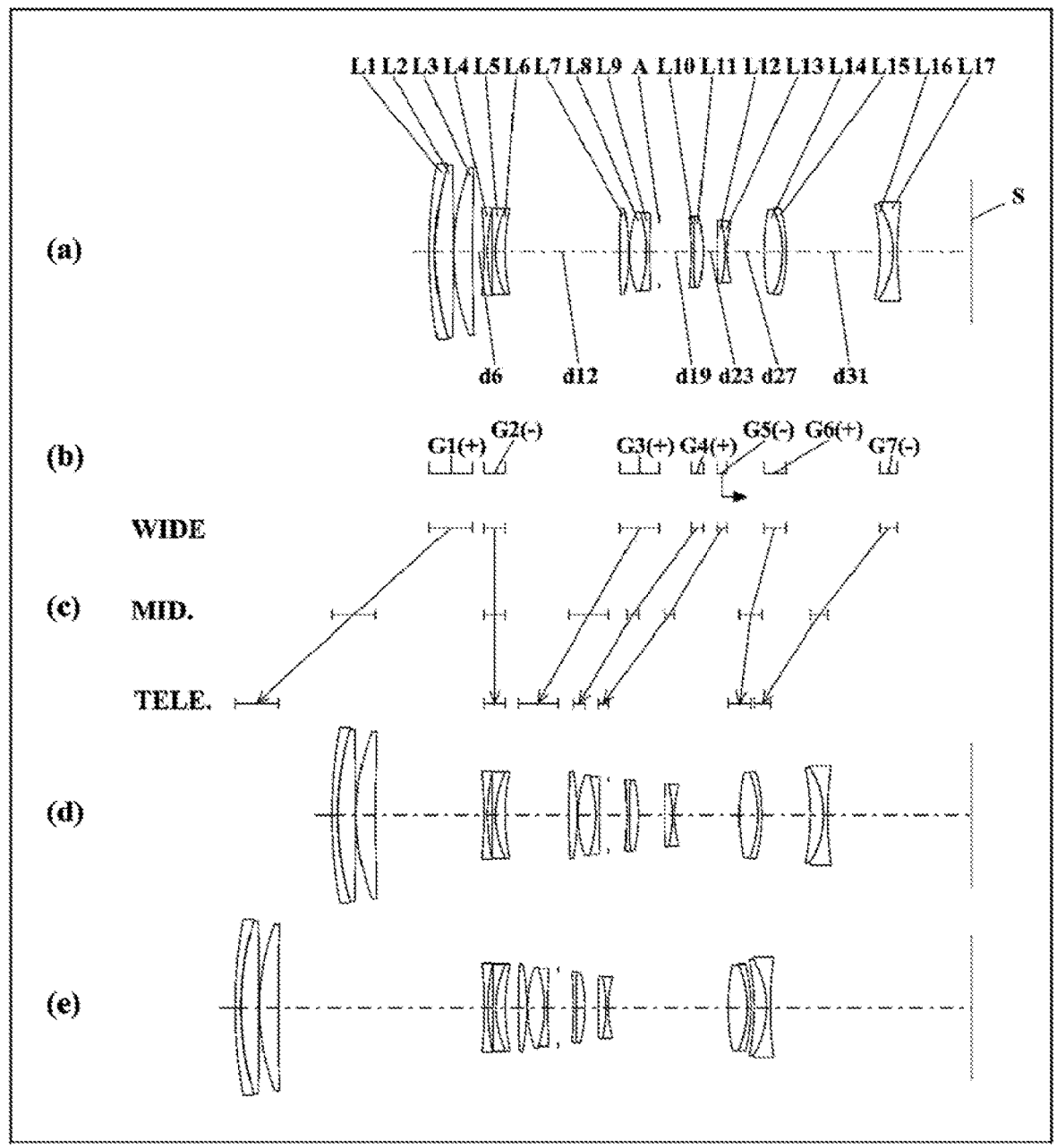
FIG. 1 illustrates lens arrangements showing what state a zoom lens system according to a first embodiment (corresponding to a first example of numerical values) assumes at an infinity focus point.
Figure 2:
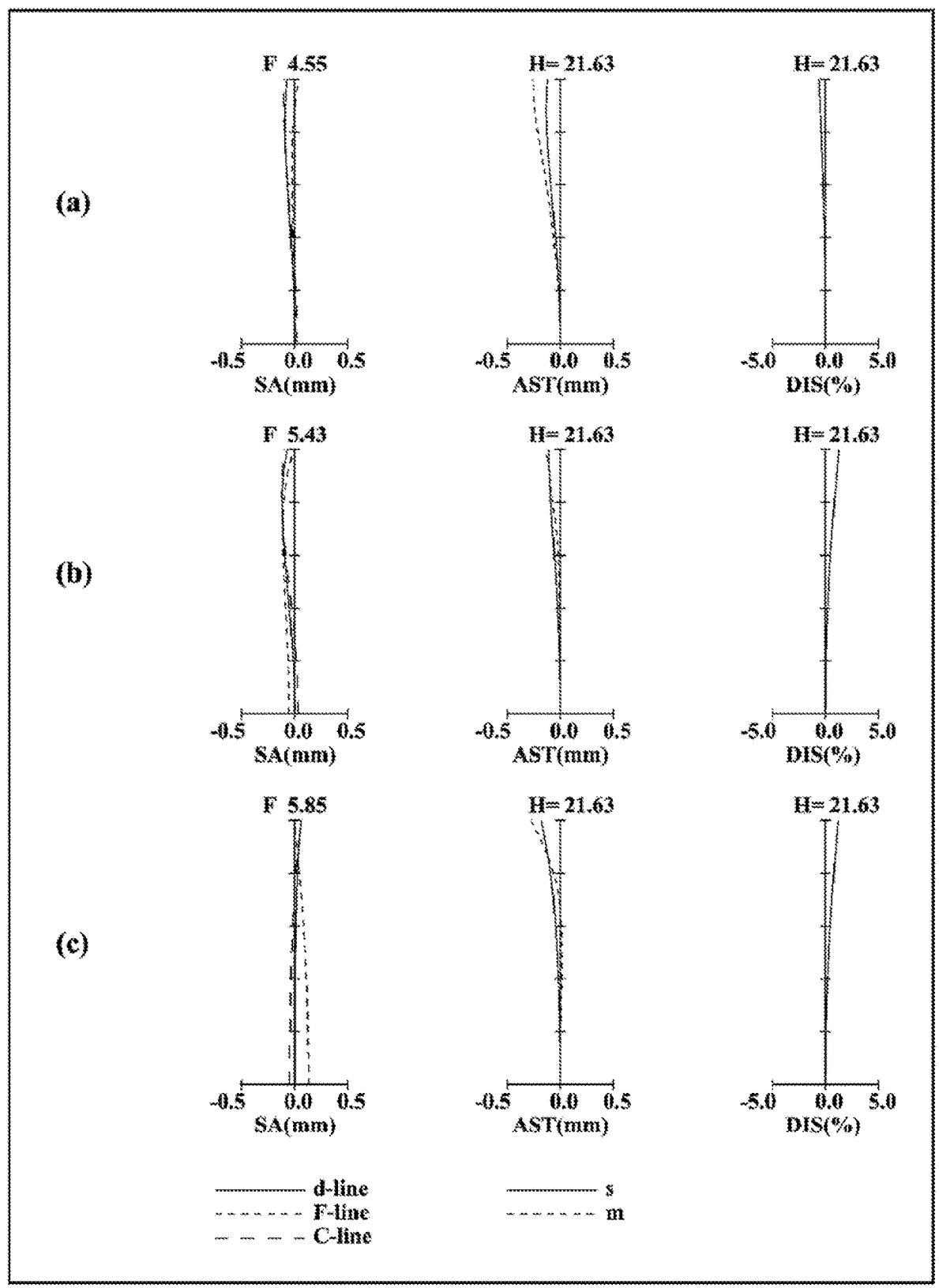
FIG. 2 illustrates longitudinal aberration diagrams showing what state the zoom lens system assumes at the infinity focus point in the first example of numerical values.
Figure 3:
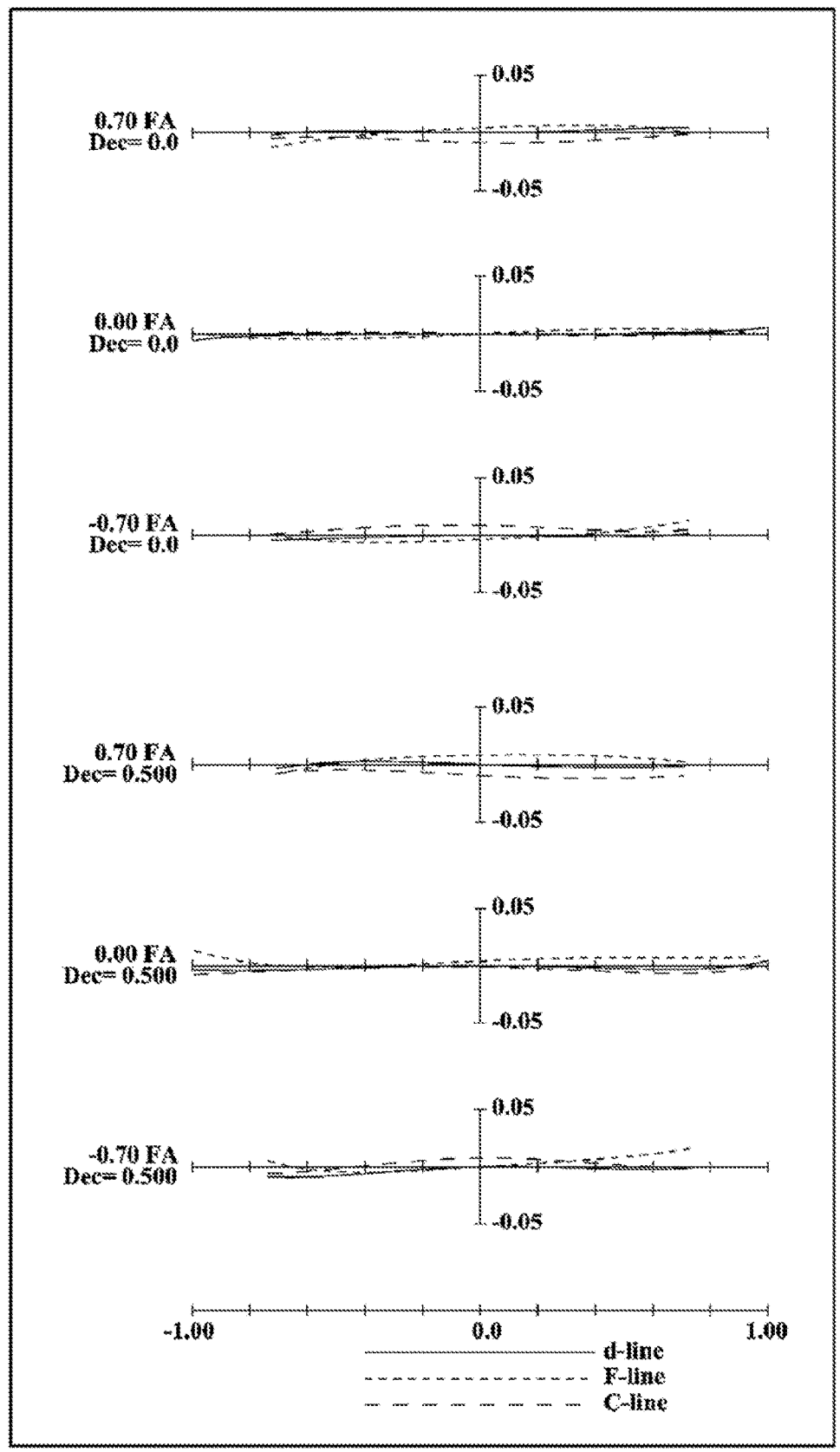
FIG. 3 illustrates lateral aberration diagrams showing a basic state where no image blur compensation is performed at the telephoto end and an image blur compensated state at the telephoto end in a zoom lens system in the first example of numerical values.

Embodiments of the present disclosure will now be described in detail with reference to the accompanying drawings as appropriate. Note that unnecessarily detailed description may be omitted. For example, detailed description of already well-known matters and redundant description of substantially the same configuration may be omitted. This is done to avoid making the following description overly redundant and thereby to help one of ordinary skill in the art understand the present disclosure easily.

In addition, note that the accompanying drawings and the following description are provided to help one of ordinary skill in the art understand the present disclosure fully and should not be construed as limiting the scope of the present disclosure, which is defined by the appended claims.

First to Fifth Embodiments

A zoom lens system according to each of first to fifth embodiments to be described below achieves improved optical performance over the entire zoom range. Next, zoom lens systems according to the first to fifth embodiments will be described one by one with reference to the accompanying drawings.

FIGS. 1, 4, 7, 10, and 13 illustrate lens arrangement diagrams according to first, second, third, fourth, and fifth embodiments, respectively, each showing what state a zoom lens system assumes at an infinity in-focus point.

In FIGS. 1, 4, 7, 10, and 13, portion (a) illustrates a lens arrangement at the wide-angle end (which is a state with the shortest focal length fW); portion (d) illustrates a lens arrangement at a middle position (which is a state with a middle focal length $fM=\sqrt{(fW*fT)}$); and portion (e) illustrates a lens arrangement at the telephoto end (which is a state with the longest focal length fT). Note that portions (a), (d), and (e) of FIGS. 1, 4, 7, 10, and 13 have the same aspect ratio.

Furthermore, in portion (a) of FIGS. 1, 4, 7, 10, and 13, the asterisk (*) attached to a surface of a particular lens indicates that the surface is an aspheric surface. Note that in the lenses, a surface with no asterisks is a spherical surface.

In the following description, a "positive lens" herein refers to a lens having positive power and a "negative lens" herein refers to a lens having negative power.

Also, in FIGS. 1, 4, 7, 10, and 13, the polygon arrows shown between portion (c) thereof each connect together the respective positions of the lens groups at the wide-angle end (Wide), middle position (Mid), and telephoto end (Tele) from top to bottom. Note that these polygon arrows just connect the wide-angle end to the middle position and the middle position to the telephoto end with the curves, and do not indicate the actual movement of the lens groups.

In each of the plurality of lens groups, a plurality of lenses included in the lens group move together. For example, the first to fourth lenses L1-L4 included in the first lens group G1 move together.

Furthermore, in portion (b) of FIGS. 1, 4, 7, 10, and 13, the respective lens groups are designated by the reference signs G1-G6 or G1-G7 corresponding to their respective positions shown in portion (a).

Furthermore, the signs (+) and (−) added to the reference signs of the respective lens groups in portion (b) of FIGS. 1, 4, 7, 10, and 13 indicate the powers of the respective lens groups G1-G6 or G1-G7. That is to say, the positive sign (+) indicates positive power, and the negative sign (−) indicates negative power.

Also, the arrows added to the lens groups in portion (b) of FIGS. 1, 4, 7, 10, and 13 each indicate the direction of movement while the zoom lens system is focusing to make a transition from the infinity in-focus state toward the close-object in-focus state. Note that in FIGS. 1, 4, 7, 10, and 13, the reference signs of respective lens groups are shown under the respective lens groups in portion (a) thereof, and therefore, an arrow indicating focusing is shown under the sign of each lens group for convenience's sake. The directions of movement of the respective lens groups during focusing will be described more specifically later with respect to each of the first through fifth embodiments.

Furthermore, in portions (a), (d), and (e) of FIGS. 1, 4, 7, 10, and 13, the straight line drawn at the right end indicates the position of the image plane S (i.e., a surface, facing the object, of the image sensor). Therefore, the left end of the drawings corresponds to the object side. Furthermore, a parallel plate such as a low-pass filter or cover glass is disposed between the lens group on the last stage facing the image plane S and the image plane S.

First Embodiment

FIG. 1 illustrates a zoom lens system according to a first embodiment.

The zoom lens system includes: a first lens group G1 having positive power; a second lens group G2 having negative power; a third lens group G3 having positive power; a fourth lens group G4 having positive power; a fifth lens group G5 having negative power; a sixth lens group G6 having positive power; and a seventh lens group G7 having negative power. The first, second, third, fourth, fifth, sixth, and seventh lens groups G1-G7 are arranged in this order such that the first lens group G1 is located closer to an object than any other lens group is and that the seventh lens group G7 is located closer to an image plane than any other lens group is.

The zoom lens system forms an image at a point on the image plane S.

The third through seventh lens groups G3-G7 form an exemplary rear group GR.

The fifth lens group G5 is an example of the $(N-2)^{th}$ lens group. The sixth lens group G6 is an example of the $(N-1)^{th}$ lens group. The seventh lens group G7 is an example of the $N^{th}$ lens group. Note that N is an algebraic number representing the number of lens groups included in the zoom lens system.

The first lens group G1 is made up of: a first lens L1 having negative power; a second lens L2 having positive power; and a third lens L3 having positive power The first lens L1, the second lens L2, and the third lens L3 are arranged in this order such that the first lens L1 is located closer to the object than any other member of this first lens group G1 and that the third lens L3 is located closer to the image plane than any other member of this first lens group G1. In this case, the first lens L1 is an example of the negative lens G1L1, the second lens L2 is an example of the positive lens G1L2, and the third lens L3 is an example of the positive lens G1L3.

The second lens group G2 is made up of: a fourth lens L4 having negative power; a fifth lens L5 having negative power; and a sixth lens L6 having positive power. The fourth lens L4, the fifth lens L5, and the sixth lens L6 are arranged in this order such that the fourth lens L4 is located closer to the object than any other member of this second lens group G2 and that the sixth lens L6 is located closer to the image plane than any other member of this second lens group G2. The fifth lens L5 and the sixth lens L6 are bonded together with an adhesive, for example, to form a bonded lens. That is to say, a single bonded lens is formed by the fifth lens L5 and the sixth lens L6.

The third lens group G3 is made up of: a seventh lens L7 having positive power; an eighth lens L8 having positive power; a ninth lens L9 having negative power; and an aperture stop A. The seventh lens L7, the eighth lens L8, the ninth lens L9, and the aperture stop A are arranged in this order such that the seventh lens L7 is located closer to the object than any other member of this third lens group G3 and that the aperture stop A is located closer to the image plane than any other member of this third lens group G3. The eighth lens L8 and the ninth lens L9 are bonded together with an adhesive, for example, to form a bonded lens.

The fourth lens group G4 is made up of: a tenth lens L10 having negative power; and an eleventh lens L11 having positive power. The tenth lens L10 and the eleventh lens L11 are arranged in this order such that the tenth lens L10 is located closer to the object than the eleventh lens L11 and that the eleventh lens L11 is located closer to the image plane than the tenth lens L10. The tenth lens L10 and the eleventh lens L11 are bonded together with an adhesive, for example, to form a bonded lens.

The fifth lens group G5 is made up of: a twelfth lens L12 having positive power; and a thirteenth lens L13 having negative power. The twelfth lens L12 and the thirteenth lens L13 are arranged in this order such that the twelfth lens L12 is located closer to the object than the thirteenth lens L13 and that the thirteenth lens L13 is located closer to the image plane than the twelfth lens L12. The twelfth lens L12 and the thirteenth lens L13 are bonded together with an adhesive, for example, to form a bonded lens.

The sixth lens group G6 is made up of: a fourteenth lens L14 having positive power; and a fifteenth lens L15 having negative power. The fourteenth lens L14 and the fifteenth lens L15 are arranged in this order such that the fourteenth lens L14 is located closer to the object than the fifteenth lens L15 and that the fifteenth lens L15 is located closer to the image plane than the fourteenth lens L14. The fourteenth lens L14 and the fifteenth lens L15 are bonded together with an adhesive, for example, to form a bonded lens.

The seventh lens group G7 is made up of: a sixteenth lens L16 having positive power; and a seventeenth lens L17 having negative power. The sixteenth lens L16 and the seventeenth lens L17 are arranged in this order such that the sixteenth lens L16 is located closer to the object than the seventeenth lens L17 and that the seventeenth lens L17 is located closer to the image plane than the sixteenth lens L16. The sixteenth lens L16 and the seventeenth lens L17 are bonded together with an adhesive, for example, to form a bonded lens.

The respective lenses will be described.

First, the respective lenses that form the first lens group G1 will be described. The first lens L1 is a meniscus lens having a convex surface facing the object. The second lens L2 is a biconvex lens. The third lens L3 is a meniscus lens having a convex surface facing the object.

Next, the respective lenses that form the second lens group G2 will be described. The fourth lens L4 is a biconcave lens. The fifth lens L5 is a meniscus lens having a convex surface facing the object. The sixth lens L6 is a meniscus lens having a convex surface facing the object.

Next, the respective lenses that form the third lens group G3 will be described. The seventh lens L7 is a biconvex lens. The eighth lens L8 is a biconvex lens. The ninth lens L9 is a biconcave lens. In this case, the eighth lens L8 is an example of the positive lens LG3p. The ninth lens L9 is an example of the negative lens LG3n.

Next, the respective lenses that form the fourth lens group G4 will be described. The tenth lens L10 is a biconcave lens. The eleventh lens L11 is a biconvex lens.

Next, the respective lenses that form the fifth lens group G5 will be described. The twelfth lens L12 is a biconvex lens. The thirteenth lens L13 is a biconcave lens.

Next, the respective lenses that form the sixth lens group G6 will be described. The fourteenth lens L14 is a biconvex lens. The fifteenth lens L15 is a meniscus lens having a convex surface facing the image.

Next, the respective lenses that form the seventh lens group G7 will be described. The sixteenth lens L16 is a meniscus lens having a convex surface facing the image. The seventeenth lens L17 is a biconcave lens. In this case, the seventeenth lens L17 is an example of the negative lens GNLn.

While the zoom lens system according to the first embodiment is zooming from the wide-angle end toward the telephoto end during a shooting session, the first lens group G1, the third lens group G3, the fourth lens group G4, the fifth lens group G5, the sixth lens group G6, and the seventh lens group G7 move toward the object with respect to the image plane S. On the other hand, the second lens group G2 is fixed while the zoom lens system is zooming from the wide-angle end toward the telephoto end during the shooting session. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 decreases, the interval between the fourth lens group G4 and the fifth lens group G5 increases from the wide-angle end through the middle position and decreases from the middle position through the telephoto end, the interval between the fifth lens group G5 and the sixth lens group G6 increases, and the interval between the sixth lens group G6 and the seventh lens group G7 decreases.

While the zoom lens system according to the first embodiment is focusing to make a transition from the infinity in-focus state toward the close-object in-focus state, the fifth lens group G5 moves along the optical axis toward the image plane.

Note that every lens (image blur compensation lens) belonging to the second lens group G2 moves perpendicularly to the optical axis to make optical compensation for image blur. This image blur compensation lens allows the zoom lens system to make compensation for the movement of an image point due to the vibration of the entire system. That is to say, this allows the zoom lens system to make optical compensation for an image blur caused by a camera shake or vibrations, for example.

Second Embodiment

Figure 4:
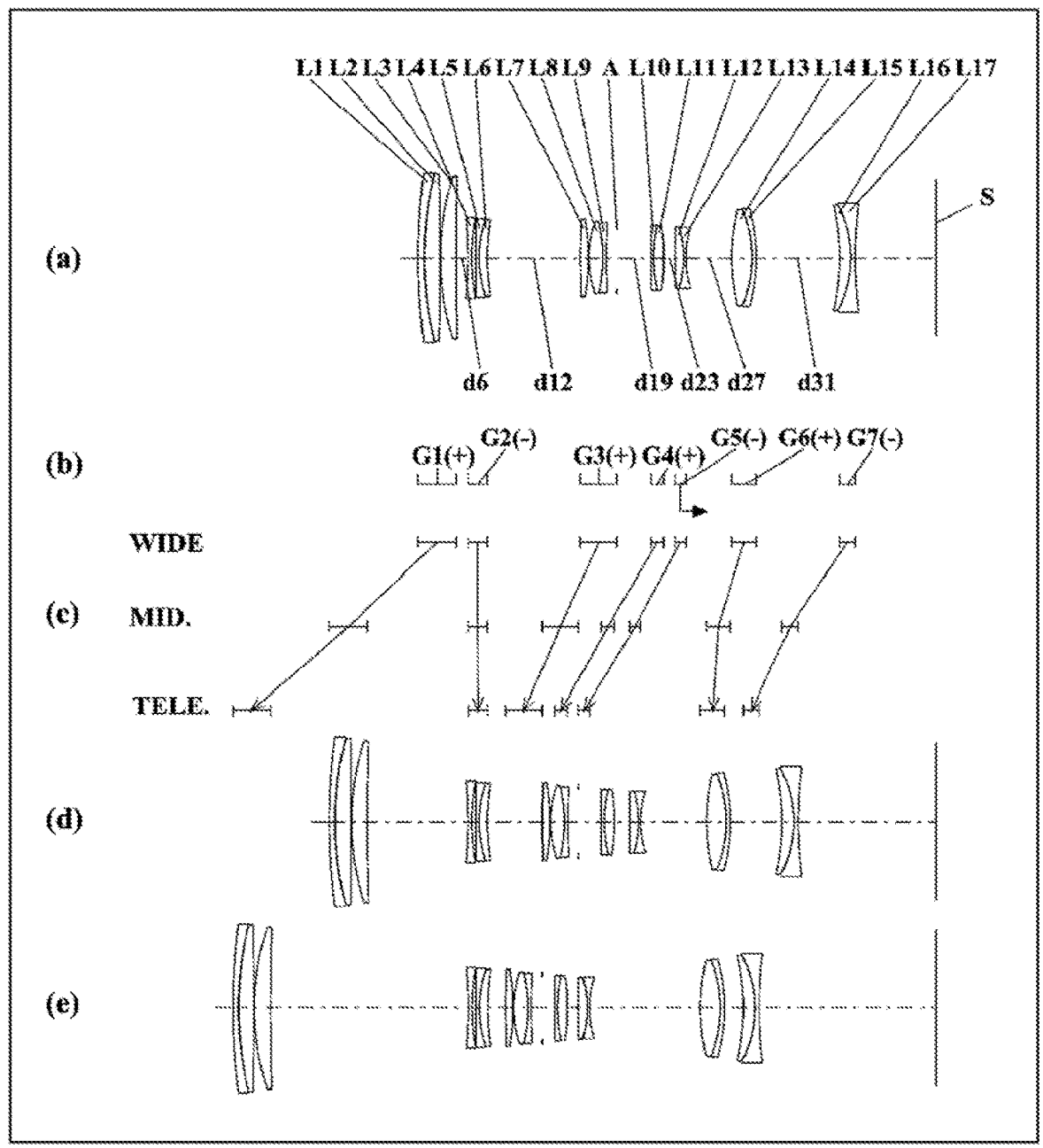
FIG. 4 illustrates lens arrangements showing what state a zoom lens system according to a second embodiment (corresponding to a second example of numerical values) assumes at an infinity focus point.
Figure 5:
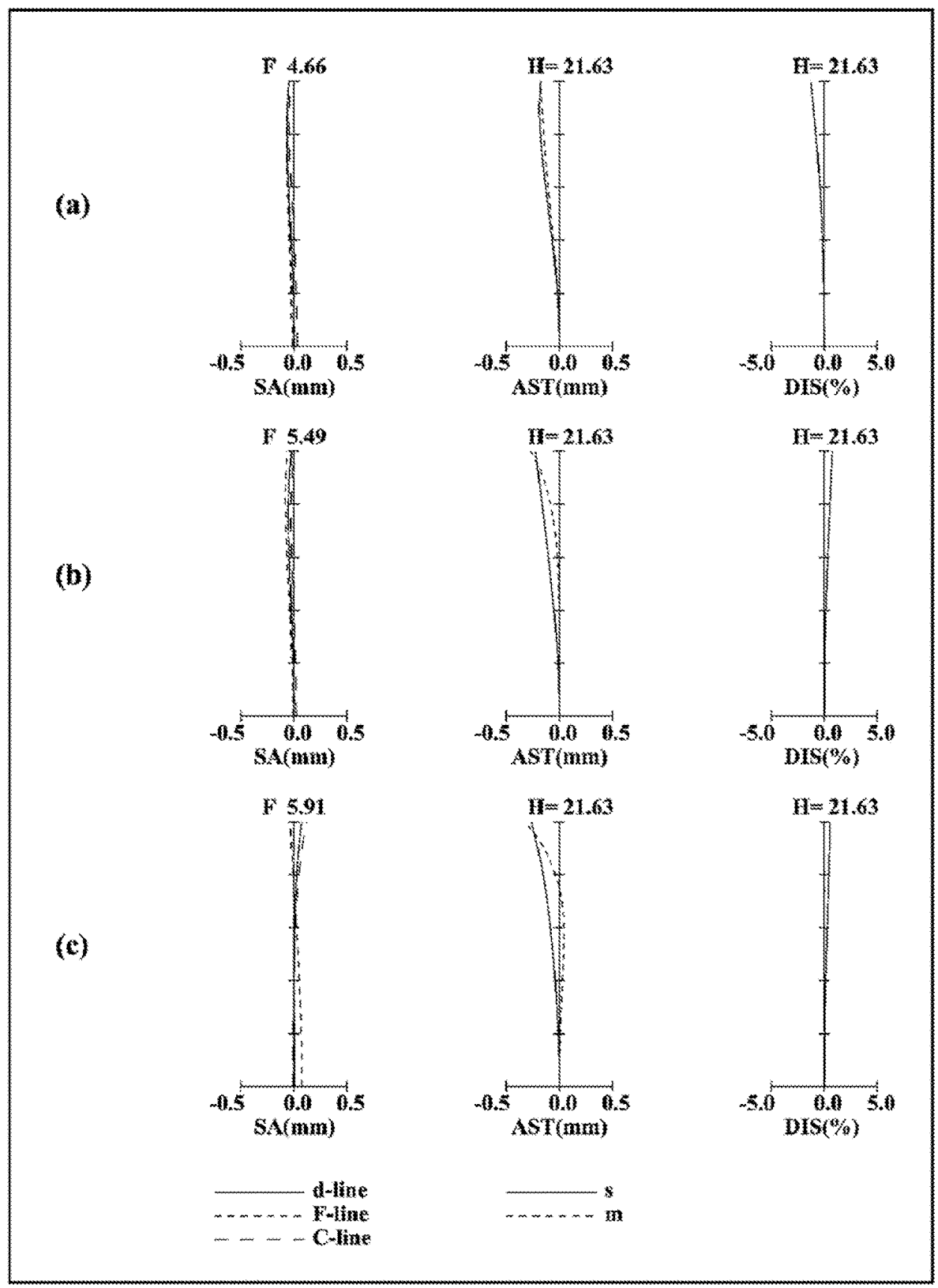
FIG. 5 illustrates longitudinal aberration diagrams showing what state the zoom lens system assumes at the infinity focus point in the second example of numerical values.
Figure 6:
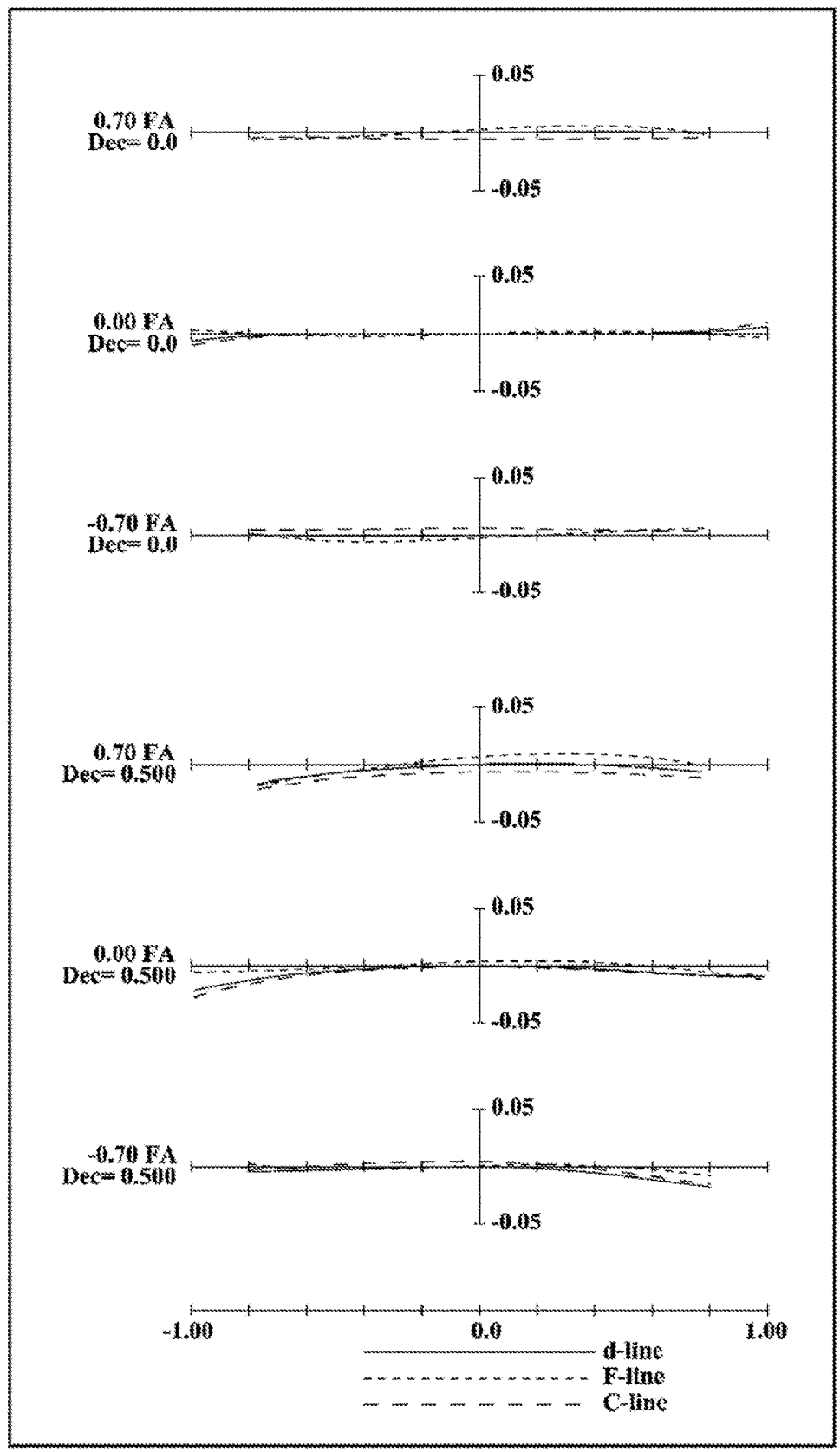
FIG. 6 illustrates lateral aberration diagrams showing a basic state where no image blur compensation is performed at the telephoto end and an image blur compensated state at the telephoto end in a zoom lens system in the second example of numerical values.

FIG. 4 illustrates a zoom lens system according to a second embodiment.

The zoom lens system includes: a first lens group G1 having positive power; a second lens group G2 having negative power; a third lens group G3 having positive power; a fourth lens group G4 having positive power; a fifth lens group G5 having negative power; a sixth lens group G6 having positive power; and a seventh lens group G7 having negative power. The first, second, third, fourth, fifth, sixth, and seventh lens groups G1-G7 are arranged in this order such that the first lens group G1 is located closer to an object than any other lens group is and that the seventh lens group G7 is located closer to an image plane than any other lens group is.

The zoom lens system forms an image at a point on the image plane S.

The third through seventh lens groups G3-G7 form an exemplary rear group GR.

The fifth lens group G5 is an example of the $(N-2)^{th}$ lens group. The sixth lens group G6 is an example of the $(N-1)^{th}$ lens group. The seventh lens group G7 is an example of the $N^{th}$ lens group.

The first lens group G1 is made up of: a first lens L1 having negative power; a second lens L2 having positive power; and a third lens L3 having positive power. The first lens L1, the second lens L2, and the third lens L3 are arranged in this order such that the first lens L1 is located closer to the object than any other member of this first lens group G1 and that the third lens L3 is located closer to the image plane than any other member of this first lens group G1. In this case, the first lens L1 is an example of the negative lens G1L1, the second lens L2 is an example of the positive lens G1L2, and the third lens L3 is an example of the positive lens G1L3.

The second lens group G2 is made up of: a fourth lens L4 having negative power; a fifth lens L5 having negative power; and a sixth lens L6 having positive power. The fourth lens L4, the fifth lens L5, and the sixth lens L6 are arranged in this order such that the fourth lens L4 is located closer to the object than any other member of this second lens group G2 and that the sixth lens L6 is located closer to the image plane than any other member of this second lens group G2. The fifth lens L5 and the sixth lens L6 are bonded together with an adhesive, for example, to form a bonded lens.

The third lens group G3 is made up of: a seventh lens L7 having positive power; an eighth lens L8 having positive power; a ninth lens L9 having negative power; and an aperture stop A. The seventh lens L7, the eighth lens L8, the ninth lens L9, and the aperture stop A are arranged in this order such that the seventh lens L7 is located closer to the object than any other member of this third lens group G3 and that the aperture stop A is located closer to the image plane than any other member of this third lens group G3. The eighth lens L8 and the ninth lens L9 are bonded together with an adhesive, for example, to form a bonded lens.

The fourth lens group G4 is made up of: a tenth lens L10 having negative power; and an eleventh lens L11 having positive power. The tenth lens L10 and the eleventh lens L11 are arranged in this order such that the tenth lens L10 is located closer to the object than the eleventh lens L11 and that the eleventh lens L11 is located closer to the image plane than the tenth lens L10. The tenth lens L10 and the eleventh lens L11 are bonded together with an adhesive, for example, to form a bonded lens.

The fifth lens group G5 is made up of: a twelfth lens L12 having positive power; and a thirteenth lens L13 having negative power. The twelfth lens L12 and the thirteenth lens L13 are arranged in this order such that the twelfth lens L12 is located closer to the object than the thirteenth lens L13 and that the thirteenth lens L13 is located closer to the image plane than the twelfth lens L12. The twelfth lens L12 and the thirteenth lens L13 are bonded together with an adhesive, for example, to form a bonded lens.

The sixth lens group G6 is made up of: a fourteenth lens L14 having positive power; and a fifteenth lens L15 having negative power. The fourteenth lens L14 and the fifteenth lens L15 are arranged in this order such that the fourteenth lens L14 is located closer to the object than the fifteenth lens L15 and that the fifteenth lens L15 is located closer to the image plane than the fourteenth lens L14. The fourteenth lens L14 and the fifteenth lens L15 are bonded together with an adhesive, for example, to form a bonded lens.

The seventh lens group G7 is made up of: a sixteenth lens L16 having positive power; and a seventeenth lens L17 having negative power. The sixteenth lens L16 and the seventeenth lens L17 are arranged in this order such that the sixteenth lens L16 is located closer to the object than the seventeenth lens L17 and that the seventeenth lens L17 is located closer to the image plane than the sixteenth lens L16. The sixteenth lens L16 and the seventeenth lens L17 are bonded together with an adhesive, for example, to form a bonded lens.

The respective lenses will be described.

First, the respective lenses that form the first lens group G1 will be described. The first lens L1 is a meniscus lens having a convex surface facing the object. The second lens L2 is a biconvex lens. The third lens L3 is a meniscus lens having a convex surface facing the object.

Next, the respective lenses that form the second lens group G2 will be described. The fourth lens L4 is a biconcave lens. The fifth lens L5 is a plano-concave lens having a concave surface facing the image. The sixth lens L6 is a meniscus lens having a convex surface facing the object.

Next, the respective lenses that form the third lens group G3 will be described. The seventh lens L7 is a biconvex lens. The eighth lens L8 is a biconvex lens. The ninth lens L9 is a biconcave lens. In this case, the eighth lens L8 is an example of the positive lens LG3p. The ninth lens L9 is an example of the negative lens LG3n.

Next, the respective lenses that form the fourth lens group G4 will be described. The tenth lens L10 is a biconcave lens. The eleventh lens L11 is a biconvex lens.

Next, the respective lenses that form the fifth lens group G5 will be described. The twelfth lens L12 is a biconvex lens. The thirteenth lens L13 is a biconcave lens.

Next, the respective lenses that form the sixth lens group G6 will be described. The fourteenth lens L14 is a biconvex lens. The fifteenth lens L15 is a meniscus lens having a convex surface facing the image.

Next, the respective lenses that form the seventh lens group G7 will be described. The sixteenth lens L16 is a meniscus lens having a convex surface facing the image.

The seventeenth lens L17 is a biconcave lens. In this case, the seventeenth lens L17 is an example of the negative lens GNLn.

While the zoom lens system according to the second embodiment is zooming from the wide-angle end toward the telephoto end during a shooting session, the first lens group G1, the third lens group G3, the fourth lens group G4, the fifth lens group G5, the sixth lens group G6, and the seventh lens group G7 move toward the object with respect to the image plane S. On the other hand, the second lens group G2 is fixed while the zoom lens system is zooming from the wide-angle end toward the telephoto end during the shooting session. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 decreases, the interval between the fourth lens group G4 and the fifth lens group G5 increases from the wide-angle end through the middle position and decreases from the middle position through the telephoto end, the interval between the fifth lens group G5 and the sixth lens group G6 increases, and the interval between the sixth lens group G6 and the seventh lens group G7 decreases.

While the zoom lens system according to the second embodiment is focusing to make a transition from the infinity in-focus state toward the close-object in-focus state, the fifth lens group G5 moves along the optical axis toward the image plane.

Note that every lens (image blur compensation lens) belonging to the second lens group G2 moves perpendicularly to the optical axis to make optical compensation for image blur. This image blur compensation lens allows the zoom lens system to make compensation for the movement of an image point due to the vibration of the entire system. That is to say, this allows the zoom lens system to make optical compensation for an image blur caused by a camera shake or vibrations, for example.

Third Embodiment

Figure 7:
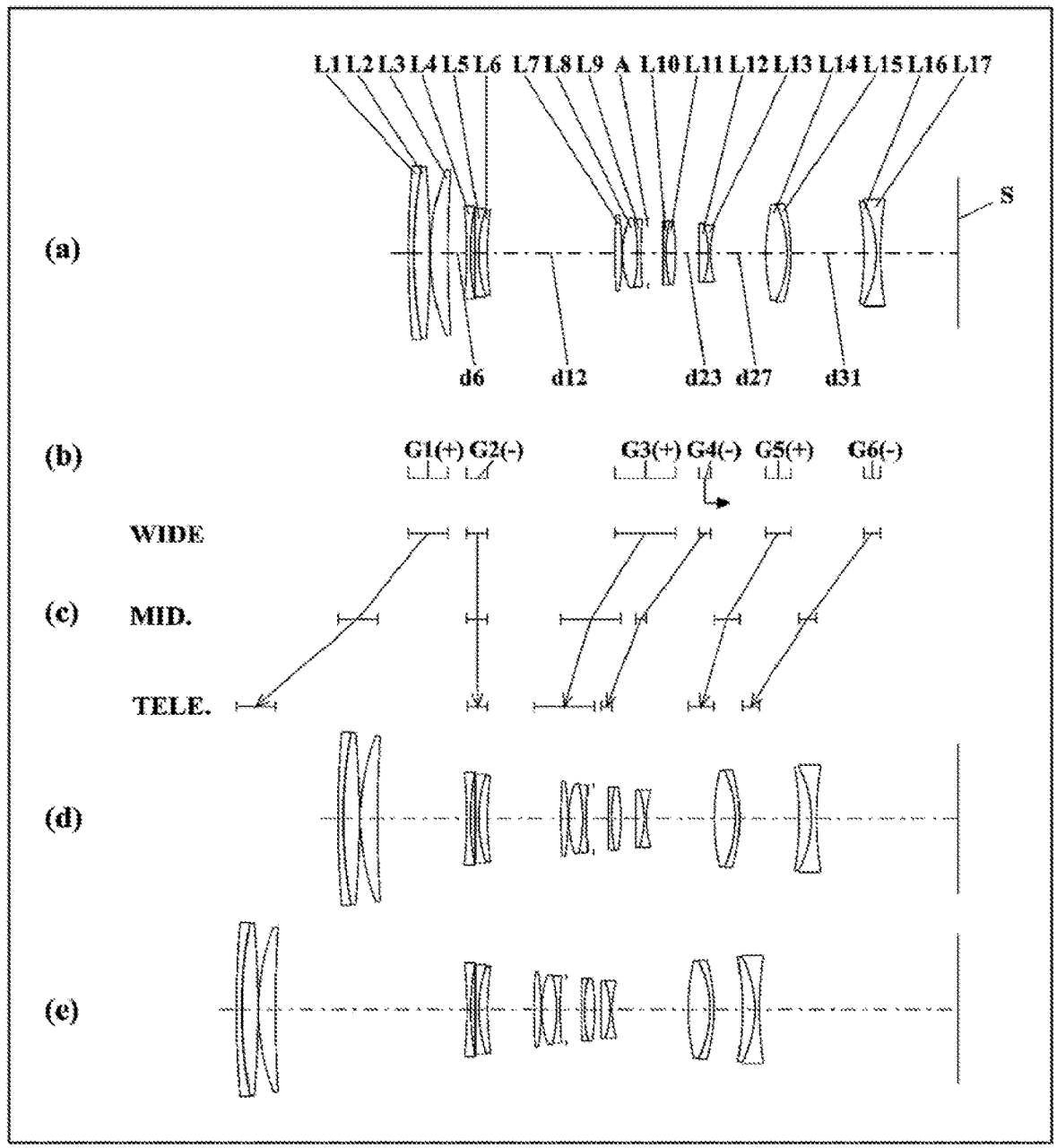
FIG. 7 illustrates lens arrangements showing what state a zoom lens system according to a third embodiment (corresponding to a third example of numerical values) assumes at an infinity focus point.
Figure 8:
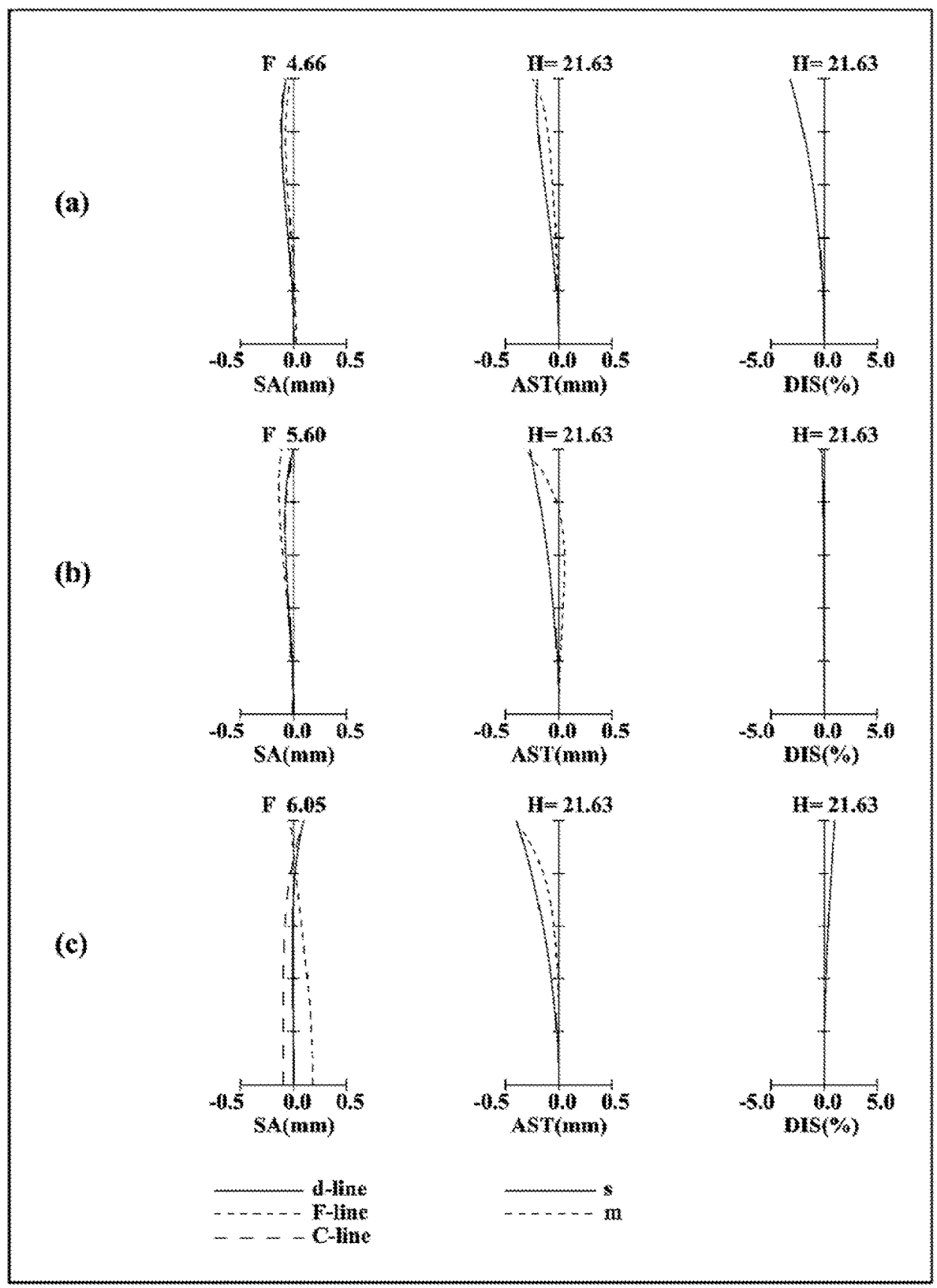
FIG. 8 illustrates longitudinal aberration diagrams showing what state the zoom lens system assumes at the infinity focus point in the third example of numerical values.
Figure 9:
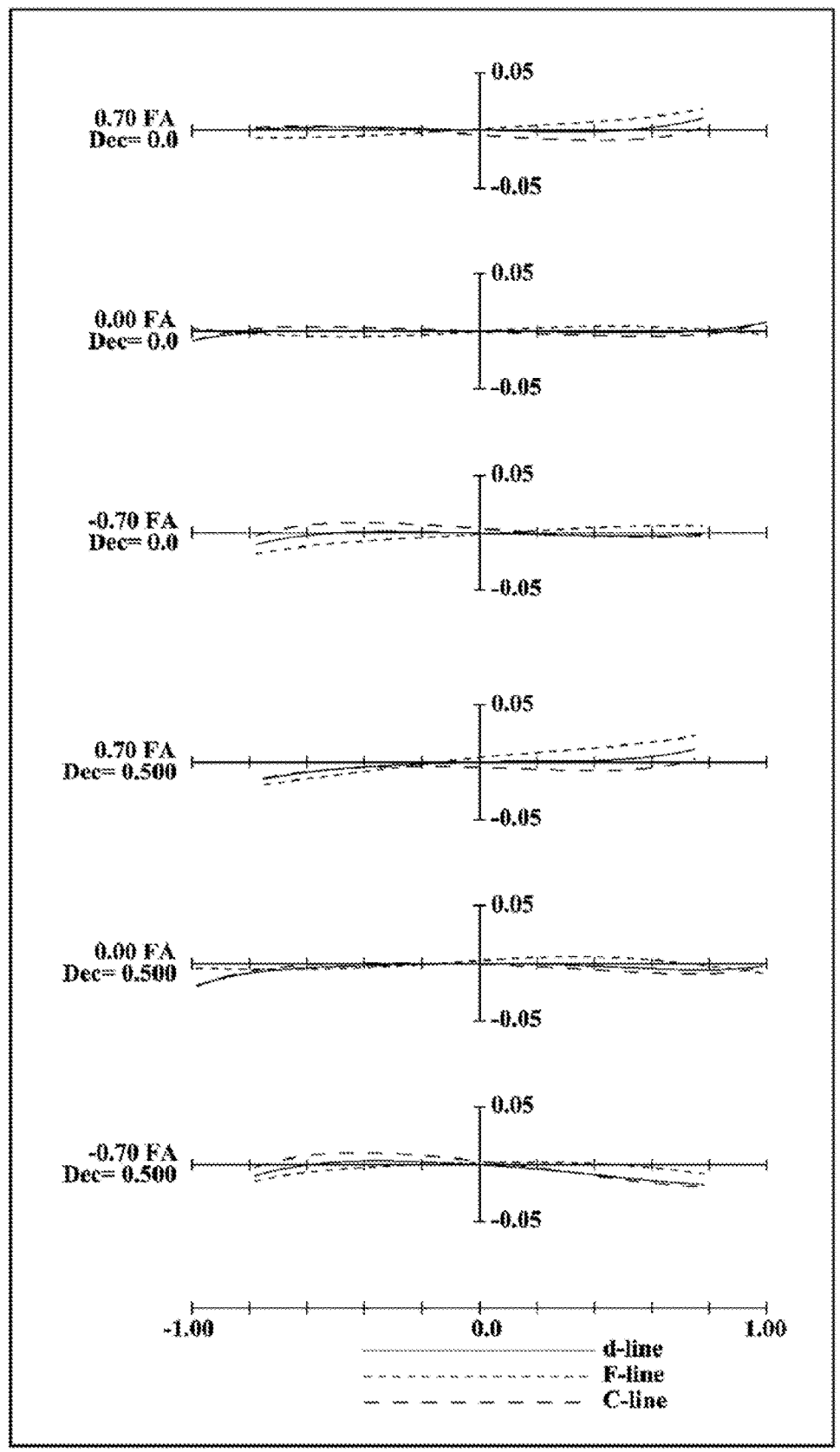
FIG. 9 illustrates lateral aberration diagrams showing a basic state where no image blur compensation is performed at the telephoto end and an image blur compensated state at the telephoto end in a zoom lens system in the third example of numerical values.

FIG. 7 illustrates a zoom lens system according to a third embodiment.

The zoom lens system includes: a first lens group G1 having positive power; a second lens group G2 having negative power; a third lens group G3 having positive power; a fourth lens group G4 having negative power; a fifth lens group G5 having positive power; and a sixth lens group G6 having negative power. The first, second, third, fourth, fifth, and sixth lens groups G1-G6 are arranged in this order such that the first lens group G1 is located closer to an object than any other lens group is and that the sixth lens group G6 is located closer to an image plane than any other lens group is.

The zoom lens system forms an image at a point on the image plane S.

The third through sixth lens groups G3-G6 form an exemplary rear group GR.

The fourth lens group G4 is an example of the $(N-2)^{th}$ lens group. The fifth lens group G5 is an example of the $(N-1)^{th}$ lens group. The sixth lens group G6 is an example of the $N^{th}$ lens group.

The first lens group G1 is made up of: a first lens L1 having negative power; a second lens L2 having positive power; and a third lens L3 having positive power. The first lens L1, the second lens L2, and the third lens L3 are arranged in this order such that the first lens L1 is located closer to the object than any other member of this first lens group G1 and that the third lens L3 is located closer to the image plane than any other member of this first lens group G1. In this case, the first lens L1 is an example of the negative lens G1L1, the second lens L2 is an example of the positive lens G1L2, and the third lens L3 is an example of the positive lens G1L3.

The second lens group G2 is made up of: a fourth lens L4 having negative power; a fifth lens L5 having negative power; and a sixth lens L6 having positive power. The fourth lens L4, the fifth lens L5, and the sixth lens L6 are arranged in this order such that the fourth lens L4 is located closer to the object than any other member of this second lens group G2 and that the sixth lens L6 is located closer to the image plane than any other member of this second lens group G2. The fifth lens L5 and the sixth lens L6 are bonded together with an adhesive, for example, to form a bonded lens.

The third lens group G3 is made up of: a seventh lens L7 having positive power; an eighth lens L8 having positive power; a ninth lens L9 having negative power; an aperture stop A; a tenth lens L10 having negative power; and an eleventh lens L11 having positive power. The seventh lens L7, the eighth lens L8, the ninth lens L9, the aperture stop A, the tenth lens L10, and the eleventh lens L11 are arranged in this order such that the seventh lens L7 is located closer to the object than any other member of this third lens group G3 and that the eleventh lens L11 is located closer to the image plane than any other member of this third lens group G3. The eighth lens L8 and the ninth lens L9 are bonded together with an adhesive, for example, to form a bonded lens. The tenth lens L10 and the eleventh lens L11 are bonded together with an adhesive, for example, to form a bonded lens.

The fourth lens group G4 is made up of: a twelfth lens L12 having positive power; and a thirteenth lens L13 having negative power. The twelfth lens L12 and the thirteenth lens L13 are arranged in this order such that the twelfth lens L12 is located closer to the object than the thirteenth lens L13 and that the thirteenth lens L13 is located closer to the image plane than the twelfth lens L12. The twelfth lens L12 and the thirteenth lens L13 are bonded together with an adhesive, for example, to form a bonded lens.

The fifth lens group G5 is made up of: a fourteenth lens L14 having positive power; and a fifteenth lens L15 having negative power. The fourteenth lens L14 and the fifteenth lens L15 are arranged in this order such that the fourteenth lens L14 is located closer to the object than the fifteenth lens L15 and that the fifteenth lens L15 is located closer to the image plane than the fourteenth lens L14. The fourteenth lens L14 and the fifteenth lens L15 are bonded together with an adhesive, for example, to form a bonded lens.

The sixth lens group G6 is made up of: a sixteenth lens L16 having positive power; and a seventeenth lens L17 having negative power. The sixteenth lens L16 and the seventeenth lens L17 are arranged in this order such that the sixteenth lens L16 is located closer to the object than the seventeenth lens L17 and that the seventeenth lens L17 is located closer to the image plane than the sixteenth lens L16. The sixteenth lens L16 and the seventeenth lens L17 are bonded together with an adhesive, for example, to form a bonded lens.

The respective lenses will be described.

First, the respective lenses that form the first lens group G1 will be described. The first lens L1 is a meniscus lens having a convex surface facing the object. The second lens L2 is a biconvex lens. The third lens L3 is a meniscus lens having a convex surface facing the object.

Next, the respective lenses that form the second lens group G2 will be described. The fourth lens L4 is a biconcave lens. The fifth lens L5 is a meniscus lens having a convex surface facing the object. The sixth lens L6 is a meniscus lens having a convex surface facing the object.

Next, the respective lenses that form the third lens group G3 will be described. The seventh lens L7 is a biconvex lens. The eighth lens L8 is a biconvex lens. The ninth lens L9 is a biconcave lens. The tenth lens L10 is a meniscus lens having a convex surface facing the object. The eleventh lens L11 is a biconvex lens. In this case, the eighth lens L8 is an example of the positive lens LG3p. The ninth lens L9 is an example of the negative lens LG3n.

Next, the respective lenses that form the fourth lens group G4 will be described. The twelfth lens L12 is a biconvex lens. The thirteenth lens L13 is a biconcave lens.

Next, the respective lenses that form the fifth lens group G5 will be described. The fourteenth lens L14 is a biconvex lens. The fifteenth lens L15 is a meniscus lens having a convex surface facing the image.

Next, the respective lenses that form the sixth lens group G6 will be described. The sixteenth lens L16 is a meniscus lens having a convex surface facing the image. The seventeenth lens L17 is a biconcave lens. The seventeenth lens L17 is an example of the negative lens GNLn.

While the zoom lens system according to the third embodiment is zooming from the wide-angle end toward the telephoto end during a shooting session, the first lens group G1, the third lens group G3, the fourth lens group G4, the fifth lens group G5, and the sixth lens group G6 move toward the object with respect to the image plane S. On the other hand, the second lens group G2 is fixed while the zoom lens system is zooming from the wide-angle end toward the telephoto end during the shooting session. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 decreases, the interval between the fourth lens group G4 and the fifth lens group G5 increases, and the interval between the fifth lens group G5 and the sixth lens group G6 decreases.

While the zoom lens system according to the third embodiment is focusing to make a transition from the infinity in-focus state toward the close-object in-focus state, the fourth lens group G4 moves along the optical axis toward the image plane.

Note that every lens (image blur compensation lens) belonging to the second lens group G2 moves perpendicularly to the optical axis to make optical compensation for image blur. This image blur compensation lens allows the zoom lens system to make compensation for the movement of an image point due to the vibration of the entire system. That is to say, this allows the zoom lens system to make optical compensation for an image blur caused by a camera shake or vibrations, for example.

Fourth Embodiment

Figure 10:
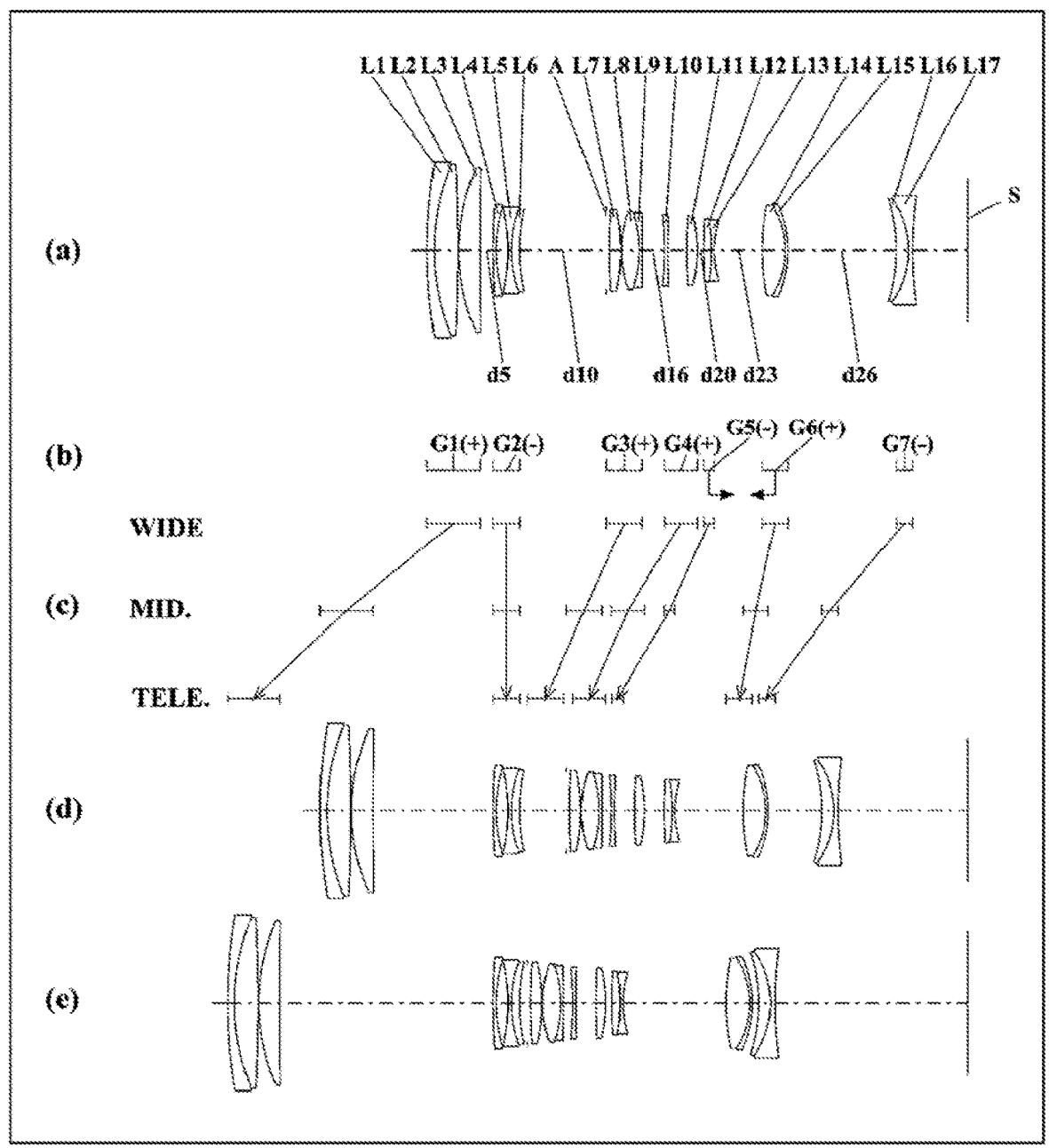
FIG. 10 illustrates lens arrangements showing what state a zoom lens system according to a fourth embodiment (corresponding to a fourth example of numerical values) assumes at an infinity focus point.
Figure 11:
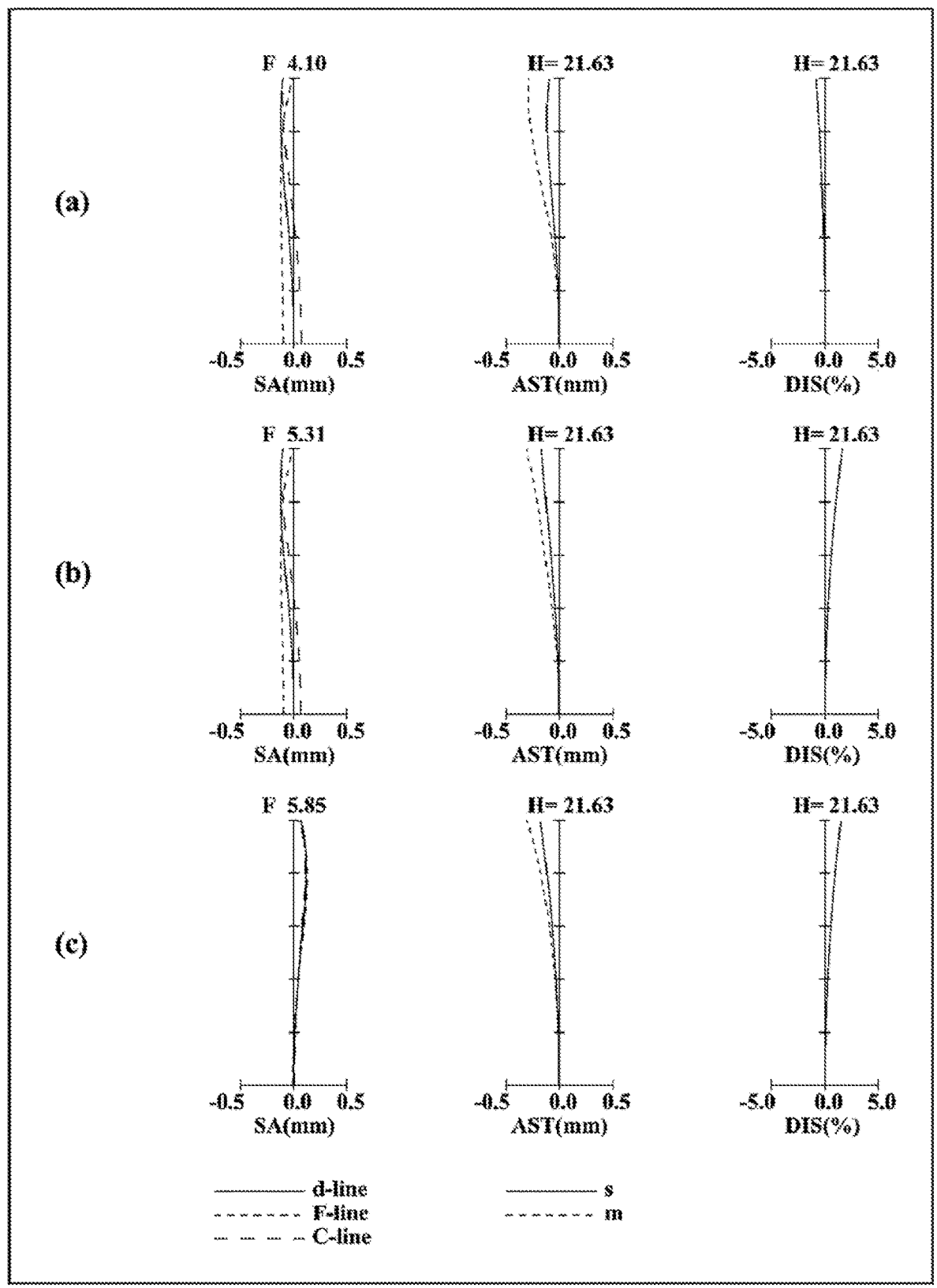
FIG. 11 illustrates longitudinal aberration diagrams showing what state the zoom lens system assumes at the infinity focus point in the fourth example of numerical values.
Figure 12:
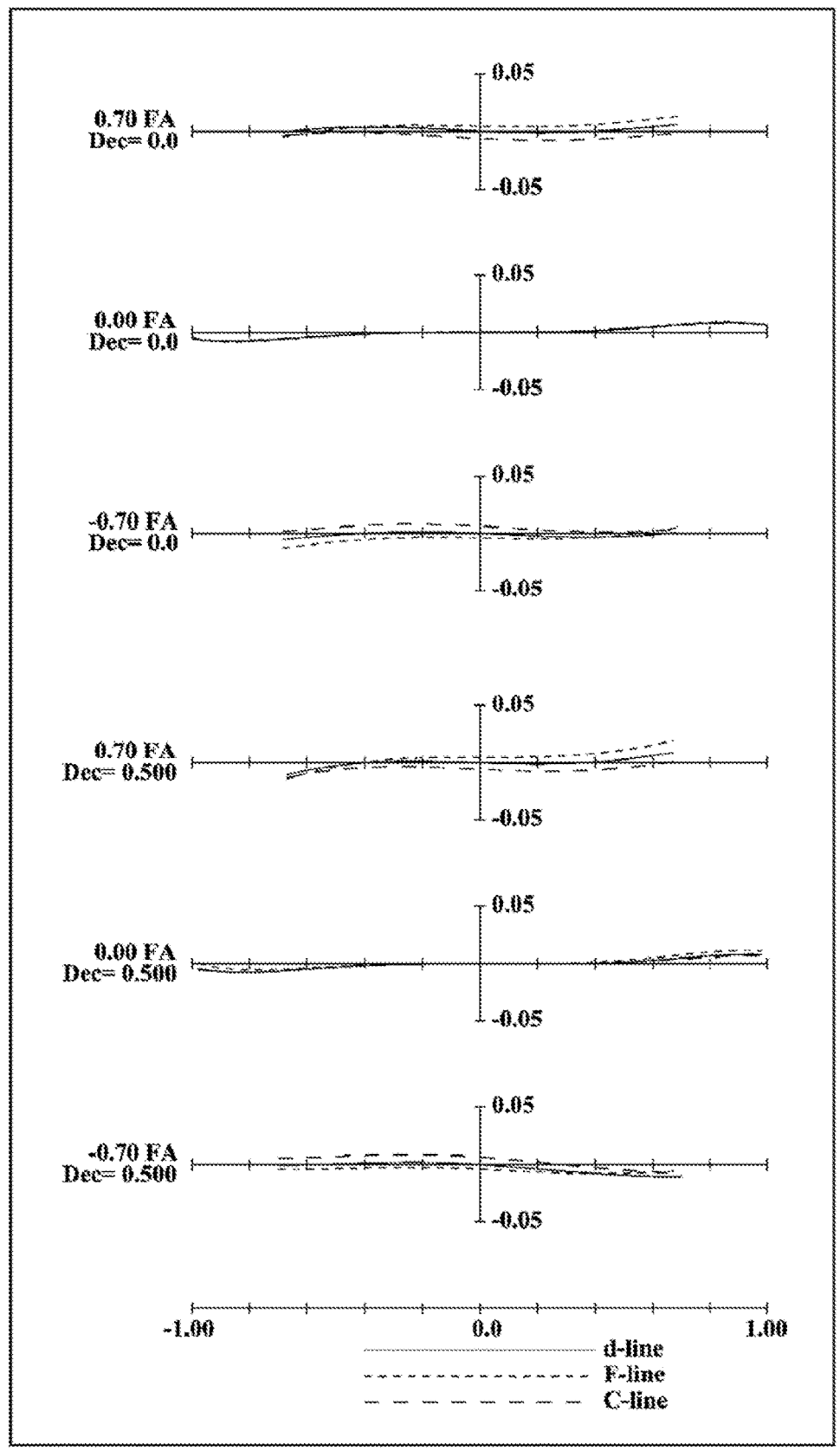
FIG. 12 illustrates lateral aberration diagrams showing a basic state where no image blur compensation is performed at the telephoto end and an image blur compensated state at the telephoto end in a zoom lens system in the fourth example of numerical values.

FIG. 10 illustrates a zoom lens system according to a fourth embodiment.

The zoom lens system includes: a first lens group G1 having positive power; a second lens group G2 having negative power; a third lens group G3 having positive power; a fourth lens group G4 having positive power; a fifth lens group G5 having negative power; a sixth lens group G6 having positive power; and a seventh lens group G7 having negative power. The first, second, third, fourth, fifth, sixth, and seventh lens groups G1-G7 are arranged in this order such that the first lens group G1 is located closer to an object than any other lens group is and that the seventh lens group G7 is located closer to an image plane than any other lens group is.

The zoom lens system forms an image at a point on the image plane S.

The third through seventh lens groups G3-G7 form an exemplary rear group GR.

The fifth lens group G5 is an example of the $(N-2)^{th}$ lens group. The sixth lens group G6 is an example of the $(N-1)^{th}$ lens group. The seventh lens group G7 is an example of the $N^{th}$ lens group.

The first lens group G1 is made up of: a first lens L1 having negative power; a second lens L2 having positive power; and a third lens L3 having positive power. The first lens L1, the second lens L2, and the third lens L3 are arranged in this order such that the first lens L1 is located closer to the object than any other member of this first lens group G1 and that the third lens L3 is located closer to the image plane than any other member of this first lens group G1. The first lens L1 and the second lens L2 are bonded together with an adhesive, for example, to form a bonded lens. In this case, the first lens L1 is an example of the negative lens G1L1, the second lens L2 is an example of the positive lens G1L2, and the third lens L3 is an example of the positive lens G1L3.

The second lens group G2 is made up of: a fourth lens L4 having negative power; a fifth lens L5 having negative power; and a sixth lens L6 having positive power. The fourth lens L4, the fifth lens L5, and the sixth lens L6 are arranged in this order such that the fourth lens L4 is located closer to the object than any other member of this second lens group G2 and that the sixth lens L6 is located closer to the image plane than any other member of this second lens group G2. The fifth lens L5 and the sixth lens L6 are bonded together with an adhesive, for example, to form a bonded lens.

The third lens group G3 is made up of: an aperture stop A; a seventh lens L7 having positive power; an eighth lens L8 having positive power; and a ninth lens L9 having negative power. The aperture stop A, the seventh lens L7, the eighth lens L8, and the ninth lens L9 are arranged in this order such that the aperture stop A is located closer to the object than any other member of this third lens group G3 and that the ninth lens L9 is located closer to the image plane than any other member of this third lens group G3. The eighth lens L8 and the ninth lens L9 are bonded together with an adhesive, for example, to form a bonded lens.

The fourth lens group G4 is made up of: a tenth lens L10 having negative power; and an eleventh lens L11 having positive power. The tenth lens L10 and the eleventh lens L11 are arranged in this order such that the tenth lens L10 is located closer to the object than the eleventh lens L11 and that the eleventh lens L11 is located closer to the image plane than the tenth lens L10.

The fifth lens group G5 is made up of: a twelfth lens L12 having positive power; and a thirteenth lens L13 having negative power. The twelfth lens L12 and the thirteenth lens L13 are arranged in this order such that the twelfth lens L12 is located closer to the object than the thirteenth lens L13 and that the thirteenth lens L13 is located closer to the image plane than the twelfth lens L12. The twelfth lens L12 and the thirteenth lens L13 are bonded together with an adhesive, for example, to form a bonded lens.

The sixth lens group G6 is made up of: a fourteenth lens L14 having positive power; and a fifteenth lens L15 having negative power. The fourteenth lens L14 and the fifteenth lens L15 are arranged in this order such that the fourteenth lens L14 is located closer to the object than the fifteenth lens L15 and that the fifteenth lens L15 is located closer to the image plane than the fourteenth lens L14. The fourteenth lens L14 and the fifteenth lens L15 are bonded together with an adhesive, for example, to form a bonded lens.

The seventh lens group G7 is made up of: a sixteenth lens L16 having positive power; and a seventeenth lens L17 having negative power. The sixteenth lens L16 and the seventeenth lens L17 are arranged in this order such that the sixteenth lens L16 is located closer to the object than the seventeenth lens L17 and that the seventeenth lens L17 is located closer to the image plane than the sixteenth lens L16. The sixteenth lens L16 and the seventeenth lens L17 are bonded together with an adhesive, for example, to form a bonded lens.

The respective lenses will be described.

First, the respective lenses that form the first lens group G1 will be described. The first lens L1 is a meniscus lens having a convex surface facing the object. The second lens L2 is a biconvex lens. The third lens L3 is a meniscus lens having a convex surface facing the object.

Next, the respective lenses that form the second lens group G2 will be described. The fourth lens L4 is a meniscus lens having a convex surface facing the object. The fifth lens L5 is a biconcave lens. The sixth lens L6 is a meniscus lens having a convex surface facing the object.

Next, the respective lenses that form the third lens group G3 will be described. The seventh lens L7 is a biconvex lens. The eighth lens L8 is a biconvex lens. The ninth lens L9 is a meniscus lens having a convex surface facing the image. In this case, the eighth lens L8 is an example of the positive lens LG3p. The ninth lens L9 is an example of the negative lens LG3n.

Next, the respective lenses that form the fourth lens group G4 will be described. The tenth lens L10 is a biconcave lens. The eleventh lens L11 is a biconvex lens.

Next, the respective lenses that form the fifth lens group G5 will be described. The twelfth lens L12 is a biconvex lens. The thirteenth lens L13 is a biconcave lens.

Next, the respective lenses that form the sixth lens group G6 will be described. The fourteenth lens L14 is a biconvex lens. The fifteenth lens L15 is a meniscus lens having a convex surface facing the image.

Next, the respective lenses that form the seventh lens group G7 will be described. The sixteenth lens L16 is a meniscus lens having a convex surface facing the image. The seventeenth lens L17 is a biconcave lens. In this case, the seventeenth lens L17 is an example of the negative lens GNLn.

While the zoom lens system according to the fourth embodiment is zooming from the wide-angle end toward the telephoto end during a shooting session, the first lens group G1, the third lens group G3, the fourth lens group G4, the fifth lens group G5, the sixth lens group G6, and the seventh lens group G7 move toward the object with respect to the image plane S. On the other hand, the second lens group G2 is fixed while the zoom lens system is zooming from the wide-angle end toward the telephoto end during the shooting session. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 decreases, the interval between the fourth lens group G4 and the fifth lens group G5 increases from the wide-angle end through the middle position and decreases from the middle position through the telephoto end, the interval between the fifth lens group G5 and the sixth lens group G6 increases, and the interval between the sixth lens group G6 and the seventh lens group G7 decreases.

While the zoom lens system according to the fourth embodiment is focusing to make a transition from the infinity in-focus state toward the close-object in-focus state, the fifth lens group G5 moves along the optical axis toward the image plane and the sixth lens group G6 moves along the optical axis toward the object.

Note that every lens (image blur compensation lens) belonging to the second lens group G2 moves perpendicularly to the optical axis to make optical compensation for image blur. This image blur compensation lens allows the zoom lens system to make compensation for the movement of an image point due to the vibration of the entire system. That is to say, this allows the zoom lens system to make optical compensation for an image blur caused by a camera shake or vibrations, for example.

Fifth Embodiment

Figure 13:
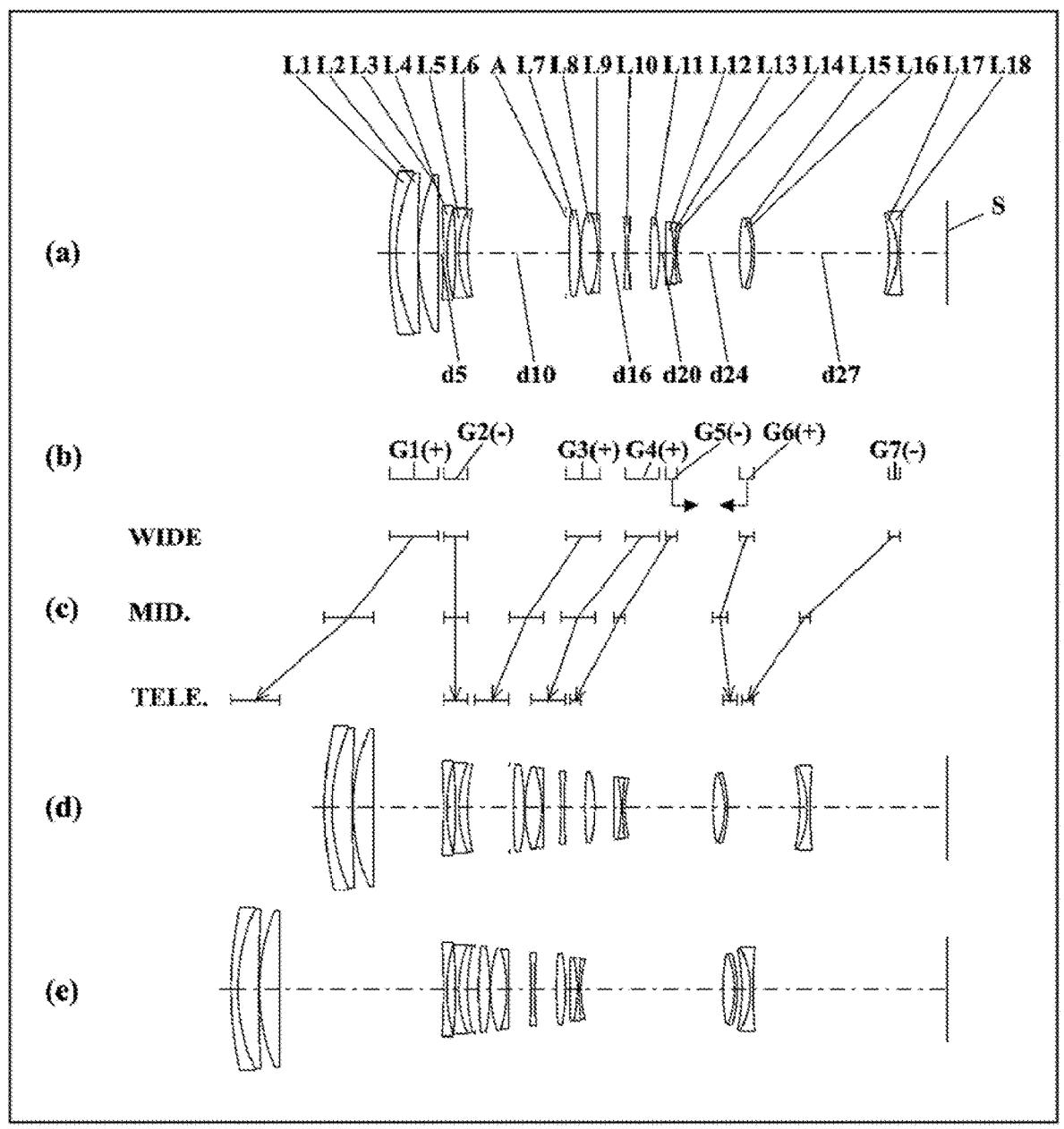
FIG. 13 illustrates lens arrangements showing what state a zoom lens system according to a fifth embodiment (corresponding to a fifth example of numerical values) assumes at an infinity focus point.
Figure 14:
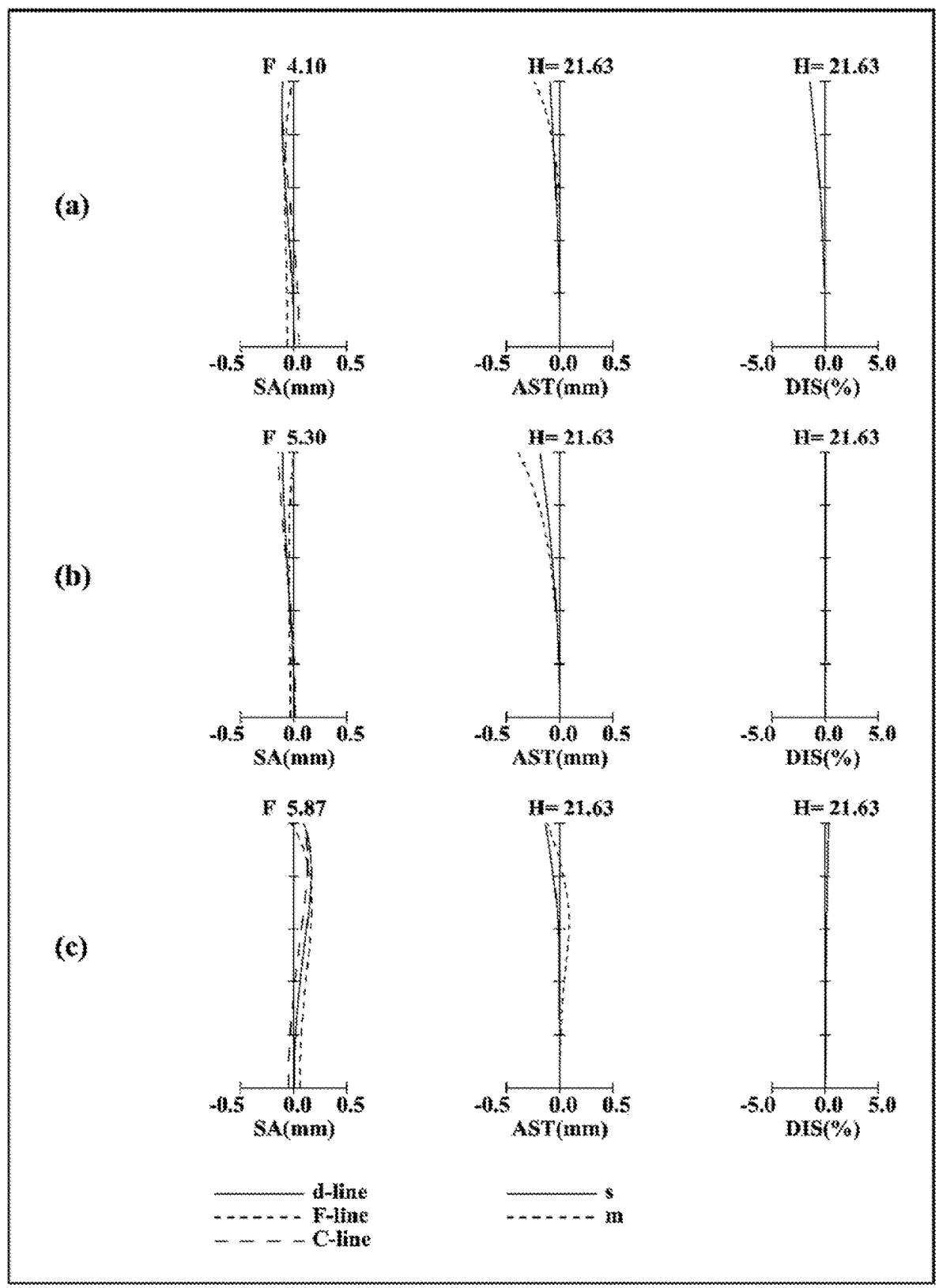
FIG. 14 illustrates longitudinal aberration diagrams showing what state the zoom lens system assumes at the infinity focus point in the fifth example of numerical values.
Figure 15:
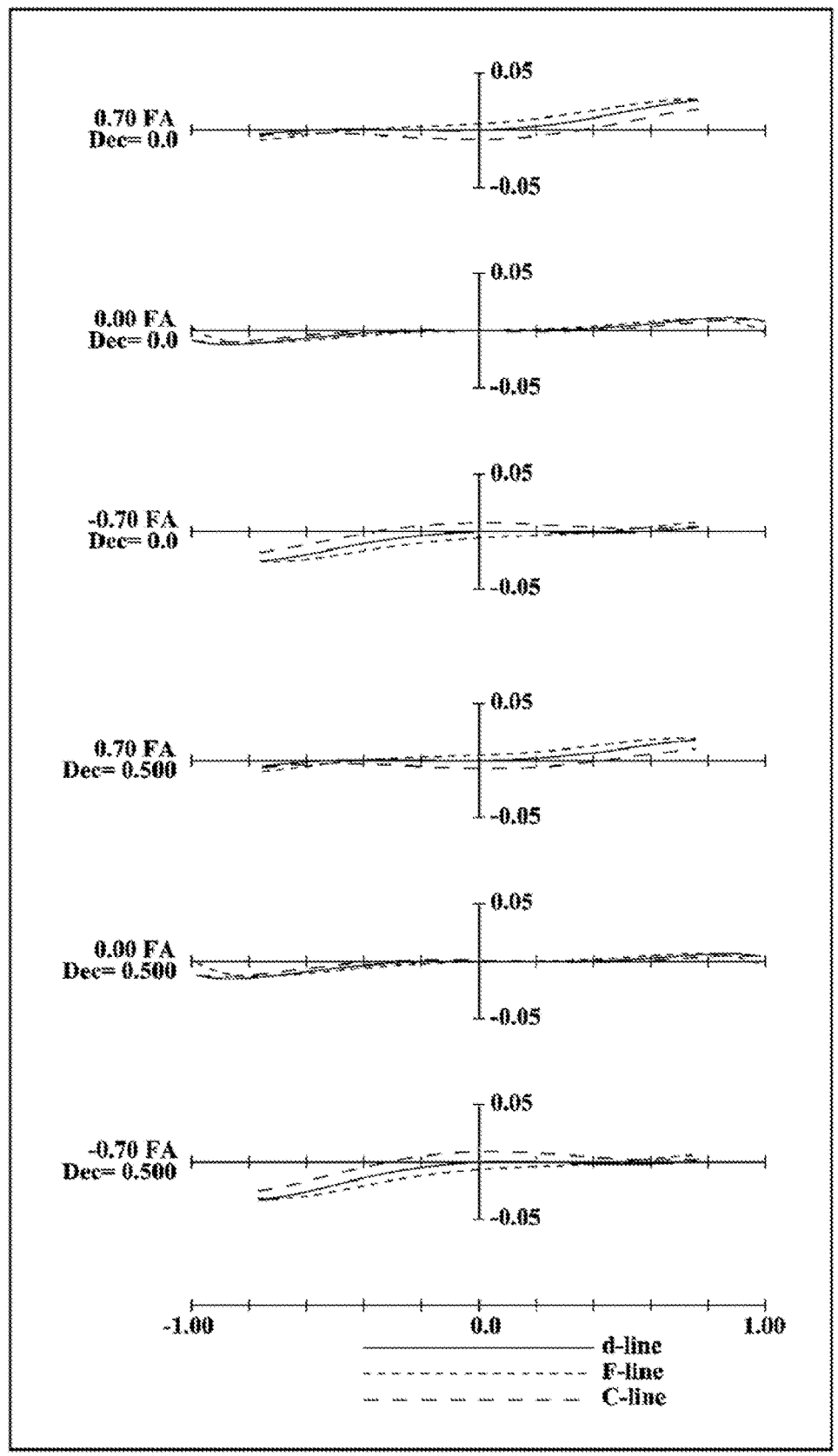
FIG. 15 illustrates lateral aberration diagrams showing a basic state where no image blur compensation is performed at the telephoto end and an image blur compensated state at the telephoto end in a zoom lens system in the fifth example of numerical values.

FIG. 13 illustrates a zoom lens system according to a fifth embodiment.

The zoom lens system includes: a first lens group G1 having positive power; a second lens group G2 having negative power; a third lens group G3 having positive power; a fourth lens group G4 having positive power; a fifth lens group G5 having negative power; a sixth lens group G6 having positive power; and a seventh lens group G7 having negative power. The first, second, third, fourth, fifth, sixth, and seventh lens groups G1-G7 are arranged in this order such that the first lens group G1 is located closer to an object than any other lens group is and that the seventh lens group G7 is located closer to an image plane than any other lens group is.

The zoom lens system forms an image at a point on the image plane S.

The third through seventh lens groups G3-G7 form an exemplary rear group GR.

The fifth lens group G5 is an example of the $(N-2)^{th}$ lens group. The sixth lens group G6 is an example of the $(N-1)^{th}$ lens group. The seventh lens group G7 is an example of the $N^{th}$ lens group.

The first lens group G1 is made up of: a first lens L1 having negative power; a second lens L2 having positive power; and a third lens L3 having positive power. The first lens L1, the second lens L2, and the third lens L3 are arranged in this order such that the first lens L1 is located closer to the object than any other member of this first lens group G1 and that the third lens L3 is located closer to the image plane than any other member of this first lens group G1. The first lens L1 and the second lens L2 are bonded together with an adhesive, for example, to form a bonded lens. In this case, the first lens L1 is an example of the negative lens G1L1, the second lens L2 is an example of the positive lens G1L2, and the third lens L3 is an example of the positive lens G1L3.

The second lens group G2 is made up of: a fourth lens L4 having negative power; a fifth lens L5 having negative power; and a sixth lens L6 having positive power. The fourth lens L4, the fifth lens L5, and the sixth lens L6 are arranged in this order such that the fourth lens L4 is located closer to the object than any other member of this second lens group G2 and that the sixth lens L6 is located closer to the image plane than any other member of this second lens group G2. The fifth lens L5 and the sixth lens L6 are bonded together with an adhesive, for example, to form a bonded lens.

The third lens group G3 is made up of: an aperture stop A; a seventh lens L7 having positive power; an eighth lens L8 having positive power; and a ninth lens L9 having negative power. The aperture stop A, the seventh lens L7, the eighth lens L8, and the ninth lens L9 are arranged in this order such that the aperture stop A is located closer to the object than any other member of this third lens group G3 and that the ninth lens L9 is located closer to the image plane than any other member of this third lens group G3. The eighth lens L8 and the ninth lens L9 are bonded together with an adhesive, for example, to form a bonded lens.

The fourth lens group G4 is made up of: a tenth lens L10 having negative power; and an eleventh lens L11 having positive power. The tenth lens L10 and the eleventh lens L11 are arranged in this order such that the tenth lens L10 is located closer to the object than the eleventh lens L11 and that the eleventh lens L11 is located closer to the image plane than the tenth lens L10.

The fifth lens group G5 is made up of: a twelfth lens L12 having positive power; a thirteenth lens L13 having negative power, and a fourteenth lens L14 having negative power. The twelfth lens L12, the thirteenth lens L13, and the fourteenth lens L14 are arranged in this order such that the twelfth lens L12 is located closer to the object than any other member of this fifth lens group G5 and that the fourteenth lens L14 is located closer to the image plane than any other member of this fifth lens group G5. The twelfth lens L12 and the thirteenth lens L13 are bonded together with an adhesive and the thirteenth lens L13 and the fourteenth lens L14 are also bonded together with an adhesive, for example, to form the bonded lens. That is to say, the bonded lens is made up of three lenses.

The sixth lens group G6 is made up of: a fifteenth lens L15 having positive power; and a sixteenth lens L16 having negative power. The fifteenth lens L15 and the sixteenth lens L16 are arranged in this order such that the fifteenth lens L15 is located closer to the object than the sixteenth lens L16 and that the sixteenth lens L16 is located closer to the image plane than the fifteenth lens L15. The fifteenth lens L15 and the sixteenth lens L16 are bonded together with an adhesive, for example, to form a bonded lens.

The seventh lens group G7 is made up of: a seventeenth lens L17 having positive power; and an eighteenth lens L18 having negative power. The seventeenth lens L17 and the eighteenth lens L18 are arranged in this order such that the seventeenth lens L17 is located closer to the object than the eighteenth lens L18 and that the eighteenth lens L18 is located closer to the image plane than the seventeenth lens L17. The seventeenth lens L17 and the eighteenth lens L18 are bonded together with an adhesive, for example, to form a bonded lens.

The respective lenses will be described.

First, the respective lenses that form the first lens group G1 will be described. The first lens L1 is a meniscus lens having a convex surface facing the object. The second lens L2 is a meniscus lens having a convex surface facing the object. The third lens L3 is a meniscus lens having a convex surface facing the object.

Next, the respective lenses that form the second lens group G2 will be described. The fourth lens L4 is a biconcave lens. The fifth lens L5 is a biconcave lens. The sixth lens L6 is a meniscus lens having a convex surface facing the object.

Next, the respective lenses that form the third lens group G3 will be described. The seventh lens L7 is a biconvex lens. The eighth lens L8 is a biconvex lens. The ninth lens L9 is a meniscus lens having a convex surface facing the image. In this case, the eighth lens L8 is an example of the positive lens LG3p. The ninth lens L9 is an example of the negative lens LG3n.

Next, the respective lenses that form the fourth lens group G4 will be described. The tenth lens L10 is a biconcave lens. The eleventh lens L11 is a biconvex lens.

Next, the respective lenses that form the fifth lens group G5 will be described. The twelfth lens L12 is a biconvex lens. The thirteenth lens L13 is a biconcave lens. The fourteenth lens L14 is a meniscus lens having a convex surface facing the object.

Next, the respective lenses that form the sixth lens group G6 will be described. The fifteenth lens L15 is a biconvex lens. The sixteenth lens L16 is a meniscus lens having a convex surface facing the image.

Next, the respective lenses that form the seventh lens group G7 will be described. The seventeenth lens L17 is a meniscus lens having a convex surface facing the image. The eighteenth lens L18 is a biconcave lens. In this case, the eighteenth lens L18 is an example of the negative lens GNLn.

While the zoom lens system according to the fifth embodiment is zooming from the wide-angle end toward the telephoto end during a shooting session, the first lens group G1, the third lens group G3, the fourth lens group G4, the fifth lens group G5, and the seventh lens group G7 move toward the object with respect to the image plane S. On the other hand, the second lens group G2 is fixed while the zoom lens system is zooming from the wide-angle end toward the telephoto end during the shooting session. Meanwhile, while the zoom lens system is zooming from the wide-angle end toward the telephoto end during the shooting session, the sixth lens group G6 moves to draw a locus that is convex with respect to the image plane. In addition, as the zoom lens system is zooming, the respective lens groups move along the optical axis such that the interval between the first lens group G1 and the second lens group G2 increases, the interval between the second lens group G2 and the third lens group G3 decreases, the interval between the third lens group G3 and the fourth lens group G4 decreases from the wide-angle end through the middle position and increases from the middle position through the telephoto end, the interval between the fourth lens group G4 and the fifth lens group G5 increases from the wide-angle end through the middle position and decreases from the middle position through the telephoto end, the interval between the fifth lens group G5 and the sixth lens group G6 increases, and the interval between the sixth lens group G6 and the seventh lens group G7 decreases.

While the zoom lens system according to the fifth embodiment is focusing to make a transition from the infinity in-focus state toward the close-object in-focus state, the fifth lens group G5 moves along the optical axis toward the image plane and the sixth lens group G6 moves along the optical axis toward the object.

Note that every lens (image blur compensation lens) belonging to the second lens group G2 moves perpendicularly to the optical axis to make optical compensation for image blur. This image blur compensation lens allows the zoom lens system to make compensation for the movement of an image point due to the vibration of the entire system. That is to say, this allows the zoom lens system to make optical compensation for an image blur caused by a camera shake or vibrations, for example.

Other Embodiments

The first, second, third, fourth, and fifth embodiments have been described as exemplary embodiments of the present disclosure. Note that the embodiments described above are only examples of the present disclosure and should not be construed as limiting. Rather, each of these embodiments may be readily modified, replaced, combined with other embodiments, provided with some additional components, or partially omitted without departing from the scope of the present disclosure.

For example, in the first to fifth embodiments described above, the zoom lens system is supposed to be used in the entire zoom range from the wide-angle end through the telephoto end. However, the zoom lens system does not have to be used in the entire zoom range. Alternatively, the zoom lens system may also be used selectively only in an extracted range where optical performance is ensured according to the desired zoom range. That is to say, the zoom lens system may also be used as a zoom lens system with lower zoom power than the zoom lens system to be described for the first, second, third, fourth, and fifth examples of numerical values corresponding to the first, second, third, fourth, and fifth embodiments, respectively. Optionally, the zoom lens system may also be used selectively as single-focus lens system only at an extracted focal length where optical performance is ensured according to the desired zoom position.

In addition, the number of the lens groups and the number of the lenses that form each lens group are substantial numbers. Optionally, a lens having substantially no power may be added to any of the lens groups described above.

Furthermore, in the embodiments described above, the image blur compensation lens is supposed to be every lens in the $(N-2)^{th}$ lens group GN-2. Alternatively, the image blur compensation lens may also be some of the lenses that form the $(N-2)^{th}$ lens group GN-2.

Also, the zoom lens systems according to the first, second, third, fourth, and fifth embodiments described above are configured to compensate for an image blur by shifting the image blur compensation lens perpendicularly to the optical axis. However, this is only an example and should not be construed as limiting. Alternatively, the image blur may also be compensated for as long as the lens may be shifted to have a component perpendicular to the optical axis. Thus, if the lens barrel may have a complex structure, for example, the zoom lens system may also be configured to compensate for the image blur by pivoting the image blur compensation lens around a center on the optical axis.

Furthermore, in the embodiments described above, an example in which the third lens group G3 includes an aperture stop A provided closer to the object than any other member of the third lens group G3 and an example in which the third lens group G3 includes an aperture stop A provided closer to the image plane than any other member of the third lens group G3 have been described as examples of the third lens group G3 with an aperture stop A. However, these are only examples and should not be construed as limiting. Alternatively, the aperture stop A may also be provided between any two lenses belonging to the third lens group G3. The aperture stop A may be provided at any position as long as the aperture stop A may move along with the third lens group G3 while the zoom lens system is zooming.

(Conditions and Advantages)

Next, conditions for implementing the zoom lens systems according to the first to fifth embodiments, for example, will be described. That is to say, a plurality of possible conditions may be defined for the zoom lens systems according to each of these five embodiments. In that case, a zoom lens system, of which the configuration satisfies all of these possible conditions, is most advantageous. Alternatively, a zoom lens system that achieves its expected advantages by satisfying any of the individual conditions to be described below may also be obtained.

A zoom lens system according to each of the first to fifth embodiments includes: a first lens group having positive power; a second lens group having negative power; and a rear group GR including at least three lens groups each having power. The rear group GR includes an $N^{th}$ lens group having negative power, an $(N-1)^{th}$ lens group having positive power, and an $(N-2)^{th}$ lens group having negative power. These lens groups are arranged in this order such that the $N^{th}$ lens group is located closer to the image plane than any other one of these lens groups. While the zoom lens system is zooming, the second lens group does not move but the interval between each pair of lens groups changes. While the zoom lens system is focusing to make a transition from an infinity in-focus state to a close-object in-focus state, at least the $(N-2)^{th}$ lens group moves along an optical axis.

The zoom lens system suitably satisfies the condition expressed by the following Inequality (1):

$$0.05 < BFw/fT < 0.15 \qquad (1)$$

where BFw is a back focus at the wide-angle end and fT is a focal length at the telephoto end.

The condition expressed by the Inequality (1) defines the ratio of the back focus at the wide-angle end (i.e., the distance from a surface, facing the image, of a lens located closest to the image plane to the image plane) to the focal length at the telephoto end. Satisfying this condition expressed by the Inequality (1) enables providing a zoom lens system with the ability to compensate for various types of aberrations sufficiently over the entire zoom range and to achieve a high shooting magnification at the telephoto end.

Conversely, if the BFw/fT ratio were less than the lower limit of the condition expressed by the Inequality (1), then it would be difficult to compensate for various types of aberrations at the wide-angle end, in particular. On the other hand, if the BFw/fT ratio were greater than the upper limit of the condition expressed by the Inequality (1), the exit pupil position would move toward the object to cause an increase in the size of the lens.

To enhance the advantage described above, the condition(s) expressed by one or both of the following Inequalities (1a) and (1b) is/are suitably satisfied:

$$0.053 < BFw/fT \qquad (1a)$$

$$BFw/fT < 0.14 \qquad (1b)$$

More suitably, to further enhance the advantage described above, the condition(s) expressed by one or both of the following Inequalities (1c) and (1d) is/are satisfied:

$$0.056 < BFw/fT \qquad (1c)$$

$$BFw/fT < 0.12 \qquad (1d)$$

In addition, the zoom lens system has the above-described configuration including a first lens group having positive power; a second lens group having negative power; and a rear group GR including at least three lens groups each having power, and the second lens group G2 is fixed while the zoom lens system is zooming. This allows the zoom lens system to have a relatively small size and compensate for various types of aberrations sufficiently, even though the zoom lens system uses no aspheric surface as the optical surface of any lens.

Also, in the zoom lens system, the first lens group suitably includes at least three lenses, namely, a negative lens G1L1, a positive lens G1L2, and a positive lens G1L3, which are arranged in this order such that the negative lens G1L1 is located closer to the object than the positive lens G1L2 or the position lens G1L3 and that the positive lens G1L3 is located closer to the image plane than the negative lens G1L1 or the position lens G1L2. The zoom lens system suitably satisfies the condition expressed by the following Inequality (2):

$$\nu d1 > 65 \tag{2}$$

where vd1 is an abbe number with respect to a d—line of at least one positive lens selected from the group consisting of a positive lens G1L2 and a positive lens G1L3.

The condition expressed by this inequality (2) defines the abbe number with respect to a d-line of at least one positive lens selected from the group consisting of a positive lens G1L2 and a positive lens G1L3. If the abbe number were less than the lower limit defined by this Inequality (2), then it would be difficult to compensate for various types of aberrations (such as an axial chromatic aberration at the telephoto end, among other things).

To enhance the advantage described above, both the positive lens G1L2 and the positive lens G1L3 suitably satisfy the condition expressed by the Inequality (2).

To further enhance the advantage described above, the condition expressed by the following Inequality (2a) is suitably satisfied:

$$\nu d1 > 80 \tag{2a}$$

To further enhance the advantage described above, the condition expressed by the following Inequality (2b) is more suitably satisfied:

$$\nu d1 > 90 \tag{2b}$$

Furthermore, the zoom lens system suitably satisfies the condition expressed by the following Inequality (3):

$$0.1 < DT/LT < 0.25 \tag{3}$$

where DT is the distance, measured at the telephoto end, along the optical axis between a surface, located closest to the image plane, of the $(N-2)^{th}$ lens group and a surface, located closest to the object, of the $(N-1)^{th}$ lens group, and LT is the total lens length at the telephoto end.

As used herein, the "total lens length at the telephoto end" refers to the distance measured at the telephoto end between a surface, facing the object, of the first lens L1 and the image plane S.

The condition expressed by this Inequality (3) defines the distance, measured at the telephoto end, along the optical axis between a surface, located closest to the image plane, of the $(N-2)^{th}$ lens group and a surface, located closest to the object, of the $(N-1)^{th}$ lens group. Satisfying the condition expressed by this Inequality (3) enables increasing the shooting magnification at the telephoto end.

Conversely, if the DT/LT ratio were less than the lower limit defined by this Inequality (3), then the distance (DT), measured at the telephoto end, along the optical axis between a surface, located closest to the image plane, of the $(N-2)^{th}$ lens group and a surface, located closest to the object, of the $(N-1)^{th}$ lens group would be insufficient, thus making it difficult to increase the shooting magnification at the telephoto end. On the other hand, if the DT/LT ratio were greater than the upper limit defined by this Inequality (3), then the total lens length (LT) at the telephoto end would be so short as to make it difficult to compensate for various types of aberrations (e.g., the field curvature, in particular) at the telephoto end.

To enhance the advantage described above, the condition(s) expressed by one or both of the following Inequalities (3a) and (3b) is/are suitably satisfied:

$$0.13 < DT/LT \tag{3a}$$

$$DT/LT < 0.23 \tag{3b}$$

More suitably, to further enhance the advantage described above, the condition(s) expressed by one or both of the following Inequalities (3c) and (3d) is/are satisfied:

$$0.15 < DT/LT \tag{3c}$$

$$DT/LT < 0.21 \tag{3d}$$

Furthermore, in the zoom lens system, the third lens group G3 suitably includes at least one positive lens LG3p and suitably satisfies the condition expressed by the following Inequality (4), for example:

$$\nu LG3p > 65 \tag{4}$$

where vLG3p is an abbe number with respect to a d—line of the positive lens LG3p.

The condition expressed by this Inequality (4) defines the abbe number with respect to a d-line of the positive lens LG3p. If the abbe number were less than the lower limit defined by this Inequality (4), then it would be difficult to compensate for various types of aberrations (such as an axial chromatic aberration over the entire zoom range, among other things).

To further enhance the advantage described above, the condition expressed by the following Inequality (4a) is suitably satisfied:

$$\nu LG3p > 80 \tag{4a}$$

To further enhance the advantage described above, the condition expressed by the following Inequality (4b) is more suitably satisfied:

$$\nu LG3p > 90 \tag{4b}$$

Furthermore, the zoom lens system suitably satisfies the condition expressed by the following inequality (5):

$$-10 < (1 - \beta T_{Gf} \times \beta T_{Gf} \times \beta T_{Gf}) \times (\beta T_{GRR} \times \beta T_{GRR}) < -5 \tag{5}$$

where $\beta T_{Gf}$ is the lateral magnification at the telephoto end of the $(N-2)^{th}$ lens group and $\beta T_{GRR}$ is the lateral magnification at the telephoto end of an optical system, which is located closer to the image plane than the $(N-2)^{th}$ lens group.

The condition expressed by this Inequality (5) defines the lateral magnification at the telephoto end of the $(N-2)^{th}$ lens group and the lateral magnification at the telephoto end of an optical system GRR, which is located closer to the image plane than the $(N-2)^{th}$ lens group. As used herein, the optical system located closer to the image plane than the $(N-2)^{th}$ lens group is an optical system consisting of the $(N-1)^{th}$ lens group and the $N^{th}$ lens group. More specifically, the optical system refers to an optical system consisting of the sixth lens group G6 and the seventh lens group G7 according to the first, second, fourth, and fifth embodiments and an optical system consisting of the fifth lens group and the sixth lens group according to the third embodiment.

If the product calculated by $(1-\beta T_{Gf} \times \beta T_{Gf}) \times (\beta T_{GRR} \times \beta T_{GRR})$ were less than the lower limit of the condition expressed by Inequality (5), then the position sensitivity of the focus lens group would be too high to control the focus lens group easily. On the other hand, if the product calculated by $(1-\beta T_{Gf} \times \beta T_{Gf}) \times (\beta T_{GRR} \times \beta T_{GRR})$ were greater than the upper limit of the condition expressed by Inequality (5), then the magnitude of movement of the focus lens group would increase too much to reduce the overall size of the focus lens group easily.

To enhance the advantage described above, the condition(s) expressed by one or both of the following Inequalities (5a) and (5b) is/are suitably satisfied:

$$-9 < (1-\beta T_{Gf} \times \beta T_{Gf}) \times (\beta T_{GRR} \times \beta T_{GRR}) \quad (5a)$$

$$(1-\beta T_{Gf} \times \beta T_{Gf}) \times (\beta T_{GRR} \times \beta T_{GRR}) < -5.5 \quad (5b)$$

More suitably, to further enhance the advantage described above, the condition(s) expressed by one or both of the following Inequalities (5c) and (5d) is/are satisfied:

$$-8 < (1-\beta T_{Gf} \times \beta T_{Gf}) \times (\beta T_{GRR} \times \beta T_{GRR}) \quad (5c)$$

$$(1-\beta T_{Gf} \times \beta T_{Gf}) \times (\beta T_{GRR} \times \beta T_{GRR}) < -6.0 \quad (5d)$$

Furthermore, in the zoom lens system, the second lens group G2 suitably moves to have a component perpendicular to the optical axis in order to compensate for the image blur and suitably satisfies the condition expressed by the following Inequality (6):

$$-3.5 < (1-\beta T_{G2}) \times \beta T_{GR} < -1.5 \quad (6)$$

where $\beta T_{G2}$ is the lateral magnification at the telephoto end of the second lens group and $\beta T_{GR}$ is the lateral magnification at the telephoto end of the rear group GR.

The condition expressed by this Inequality (6) defines the image blur compensation sensitivity at the telephoto end of the second lens group G2 that is an image blur compensation lens group.

If the product calculated by $(1-\beta T_{G2}) \times \beta T_{GR}$ were less than the lower limit of the condition expressed by this Inequality (6), then the image blur compensation sensitivity of the image blur compensation lens group would increase too much to compensate for the image blur accurately and easily. On the other hand, if the product calculated by $(1-\beta T_{G2}) \times \beta T_{GR}$ were greater than the upper limit of the condition expressed by Inequality (6), then the magnitude of vertical movement of the image blur compensation lens group would increase so much as to cause a significant increase in the size of the lens system.

To enhance the advantage described above, the condition(s) expressed by one or both of the following Inequalities (6a) and (6b) is/are suitably satisfied:

$$-3.2 < (1-\beta T_{G2}) \times \beta T_{GR} \quad (6a)$$

$$(1-\beta T_{G2}) \times \beta T_{GR} < -1.7 \quad (6b)$$

More suitably, to further enhance the advantage described above, the condition(s) expressed by one or both of the following Inequalities (6c) and (6d) is/are satisfied:

$$-3.0 < (1-\beta T_{G2}) \times \beta T_{GR} \quad (6c)$$

$$(1-\beta T_{G2}) \times \beta T_{GR} < -1.8 \quad (6d)$$

Also, in the zoom lens system, each of the lens groups, which are located at most second closest to the object, in the rear group GR is suitably a single bonded lens formed by bonding two or more lenses together.

This reduces the number of lenses required, thus enabling facilitating the manufacturing process of the zoom lens system. In addition, this also reduces the overall weight of the zoom lens system, thus enabling high-speed focusing.

Furthermore, the zoom lens system according to each of the first to fifth embodiments described above includes at least six lens groups, each having power. While the zoom lens system is zooming, the interval between each pair of lens groups changes. In addition, each of three lens groups, respectively located closest, second closest, and third closest to the image plane, consists of one or more bonded lenses alone.

If each of the three lens groups, respectively located closest, second closest, and third closest to the image plane, consisted of single lenses alone, then it would be difficult to properly compensate for the chromatic aberration and a variation in spherical aberration and field curvature due to zooming. Also, if each of the three lens groups, respectively located closest, second closest, and third closest to the image plane, included optical elements which are spaced from each other, then it would be difficult to maintain the interval, eccentricity, and tilt of the lenses, thus often causing a significant difference in quality between individual products due to a dispersion during the manufacturing process (i.e., manufacturing error).

On the other hand, if each of the three lens groups, respectively located closest, second closest, and third closest to the image plane, consists of bonded lenses alone, then even a telephoto zoom lens would still be able to reduce the chances of causing a decline in imaging performance due to the dispersion involved with the manufacturing process while properly compensating for the variations in spherical aberration and field curvature due to zooming.

To enhance the advantage described above, each of the three lens groups, respectively located closest, second closest, and third closest to the image plane, suitably consists of a single bonded lens alone or each of the four lens groups, respectively located closest, second closest, third closest, and fourth closest to the image plane, suitably consists of one or more bonded lenses alone.

More suitably, to further enhance the advantage described above, each of the four lens groups, which are respectively located closest, second closest, third closest, and fourth closest to the image plane, consists of only one bonded lens.

Furthermore, in the zoom lens system, the second lens group G2 suitably does not move but is fixed with respect to the image plane while the zoom lens system is zooming.

This allows simplifying the structure of a cam mechanism for driving a lens frame that holds lens groups moving during zooming, thus enabling reducing the size of the lens system.

Furthermore, an $N^{th}$ lens group, which is located closer to the image plane than any other lens group of the zoom lens system, suitably includes a negative lens GNLn, and satisfies a condition expressed by the following Inequality (7):

$$-0.3 < fGNLn/LW < 0 \quad (7)$$

where fGNLn is a focal length of the negative lens GNLn and LW is a total lens length at the wide-angle end.

The condition expressed by this Inequality (7) defines the ratio of the focal length of the negative lens GNLn in the $N^{th}$ lens group that is a lens group located closest to the image plane to the total lens length at the wide-angle end.

If the fGNLn/LW ratio were less than the lower limit of the condition expressed by this Inequality (7), then the power of the negative lens GNLn would increase too much to properly compensate for the field curvature at the wide-angle end, among other things. On the other hand, if the fGNLn/LW ratio were greater than the upper limit of the condition expressed by this Inequality (7), then the exit pupil position would shift toward the object, thus causing an increase in the size of the lens system.

To enhance the advantage described above, the condition(s) expressed by one or both of the following Inequalities (7a) and (7b) is/are suitably satisfied:

$$-0.25 < fGNLn/LW \qquad (7a)$$

$$fGNLn/LW < -0.10 \qquad (7b)$$

More suitably, to further enhance the advantage described above, the condition(s) expressed by one or both of the following Inequalities (7c) and (7d) is/are satisfied:

$$-0.20 < fGNLn/LW \qquad (7c)$$

$$fGNLn/LW < -0.15 \qquad (7d)$$

Furthermore, the zoom lens system suitably satisfies the condition expressed by the following Inequality (8), for example:

$$0.3 < R\_GN_c/fG_N < 0.7 \qquad (8)$$

where $R\_GN_c$ is the radius of curvature of a bonded face of a bonded lens that forms part of an $N^{th}$ lens group located closer to the image plane than any other lens group of the zoom lens system, and $fG_N$ is the focal length of the $N^{th}$ lens group.

The condition expressed by this Inequality (8) defines the ratio of the radius of curvature of a bonded face of a bonded lens that forms part of an $N^{th}$ lens group located closer to the image plane than any other lens group of the zoom lens system to the focal length of the $N^{th}$ lens group.

If the $R\_GN_c/fG_N$ ratio were less than the lower limit of the condition expressed by this Inequality (8), then the radius of curvature of the bonded face of the bonded lens that forms part of the $N^{th}$ lens group would be too small to manufacture the bonded lens easily. On the other hand, if the $R\_GN_c/fG_N$ ratio were greater than the upper limit of the condition expressed by Inequality (8), then it would be difficult to compensate for the chromatic aberration of magnification over the entire zoom range.

To enhance the advantage described above, the condition(s) expressed by one or both of the following Inequalities (8a) and (8b) is/are suitably satisfied:

$$0.35 < R\_GN_c/fG_N \qquad (8a)$$

$$R\_GN_c/fG_N < 0.60 \qquad (8b)$$

More suitably, to further enhance the advantage described above, the condition(s) expressed by one or both of the following Inequalities (8c) and (8d) is/are satisfied:

$$0.40 < R\_GN_c/fG_N \qquad (8c)$$

$$R\_GN_c/fG_N < 0.57 \qquad (8d)$$

Furthermore, if a lens group located closer to the image plane than any other lens group of the zoom lens system is called an $N^{th}$ lens group, another lens group located adjacent to, and closer to an object than, the $N^{th}$ lens group is called an $(N-1)^{th}$ lens group, and still another lens group located adjacent to, and closer to the object than, the $(N-1)^{th}$ lens group is called an $(N-2)$th lens group, while the zoom lens system is focusing to make a transition from an infinity in-focus state toward a close-object in-focus state, at least the $(N-2)^{th}$ lens group suitably moves along an optical axis, and the zoom lens system suitably satisfies a condition expressed by the following Inequality (9):

$$-1.5 < fG_{N-1}/fG_N < -0.5 \qquad (9)$$

where $fG_{N-1}$ is the focal length of the $(N-1)^{th}$ lens group and $fG_N$ is the focal length of the $N^{th}$ lens group.

The condition expressed by this Inequality (9) defines the ratio of the focal length of the $(N-1)^{th}$ lens group to the focal length of the $N^{th}$ lens group.

If the focal length ratio were less than the lower limit of the condition expressed by this Inequality (9), then the power of the $N^{th}$ lens group would be too high to properly compensate for the field curvature over the entire zoom range. On the other hand, if the focal length ratio were greater than the upper limit of the condition expressed by the Inequality (9), the exit pupil position would move toward the image plane to cause an increase in the size of the lens.

To enhance the advantage described above, the condition(s) expressed by one or both of the following Inequalities (9a) and (9b) is/are suitably satisfied:

$$-1.25 < fG_{N-1}/fG_N \qquad (9a)$$

$$fG_{N-1}/fG_N < -0.6 \qquad (9b)$$

More suitably, to further enhance the advantage described above, the condition(s) expressed by one or both of the following Inequalities (9c) and (9d) is/are satisfied:

$$-1.10 < fG_{N-1}/fG_N \qquad (9c)$$

$$fG_{N-1}/fG_N < -0.7 \qquad (9d)$$

Furthermore, in the zoom lens system, the rear group GR further includes a third lens group G3 located closer to an object than any other lens group of the rear group GR. If a negative lens, having the largest refractive index with respect to a d-line out of at least one negative lens that forms the third lens group G3, is a negative lens LG3n, the zoom lens system suitably satisfies the condition expressed by the following Inequality (10):

$$nLG3n > 1.95 \qquad (10)$$

where nLG3n is a refractive index of the negative lens LG3n with respect to a d-line.

The condition expressed by the Inequality (10) defines the refractive index of the negative lens LG3n with respect to a d-line. If the refractive index of the negative lens LG3n were less than the lower limit of the condition expressed by the Inequality (10), then it would be difficult to compensate for various types of aberrations, e.g., the spherical aberration at the telephoto end, among other things.

To enhance the advantage described above, the condition expressed by the following Inequality (10a) is suitably satisfied:

$$nLG3n > 2.00 \qquad (10a)$$

Furthermore, in the zoom lens system, the rear group GR further includes a third lens group G3 located closer to an object than any other lens group of the zoom lens system. If a negative lens, having the smallest Abbe number with respect to a d-line out of at least one negative lens that forms the third lens group G3, is a negative lens LG3n, the zoom lens system suitably satisfies a condition expressed by the following Inequality (11):

$$vLG3n < 35.0 \qquad (11)$$

where vLG3n is an Abbe number of the negative lens LG3n with respect to a d-line.

The condition expressed by the Inequality (11) defines the Abbe number of the negative lens LG3n with respect to a d-line. If the Abbe number of the negative lens LG3n were greater than the upper limit of the condition expressed by the Inequality (11), then it would be difficult to compensate for various types of aberrations, e.g., the axial chromatic aberration over the entire zoom range, among other things.

To enhance the advantage described above, the condition expressed by the following Inequality (11a) is suitably satisfied:

$$\nu LG3n < 30.0 \tag{11a}$$

Furthermore, the zoom lens system suitably satisfies the condition expressed by the following Inequality (12):

$$0.2 < fT/LT < 1.5 \tag{12}$$

where fT is a focal length at the telephoto end and LT is a total lens length at the telephoto end.

As used herein, the total lens length at the telephoto end refers to the distance, measured at the telephoto end, between a surface, facing the object, of the first lens L1 and the image plane S.

The condition expressed by the Inequality (12) defines the ratio of the focal length at the telephoto end to the total lens length at the telephoto end.

If the fT/LT ratio were less than the lower limit of the condition expressed by the Inequality (12), then the total lens length would increase too much with respect to the focal length at the telephoto end to avoid a significant increase in the size of the zoom lens system. On the other hand, if the fT/LT ratio were greater than the upper limit of the condition expressed by the Inequality (12), then the focal length would increase too much with respect to the total lens length at the telephoto end, thus making the zoom lens system small with a short total lens length. Nevertheless, in that case, the absolute value of the power of each lens group would be too great to avoid producing various types of aberrations, e.g., spherical aberration, among other things, in each lens group. In that case, it would be difficult to compensate for those various types of aberrations.

To enhance the advantage described above, the condition(s) expressed by one or both of the following Inequalities (12a) and (12b) is/are suitably satisfied:

$$0.4 < fT/LT \tag{12a}$$

$$fT/LT < 1.4 \tag{12b}$$

More suitably, to further enhance the advantage described above, the condition(s) expressed by one or both of the following Inequalities (12c) and (12d) is/are satisfied:

$$0.7 < fT/LT \tag{12c}$$

$$fT/LT < 1.3 \tag{12d}$$

Furthermore, the zoom lens system suitably satisfies the condition expressed by the following Inequality (13):

$$0.50 < fT/LDT < 1.85 \tag{13}$$

where fT is a focal length at a telephoto end, and LDT is a distance, measured at the telephoto end, along an optical axis from an object-side surface of a lens located closest to the object to an image-side surface of a lens located closest to the image plane.

The condition expressed by the Inequality (13) defines the ratio of the focal length at the telephoto end of the zoom lens system to the distance from an object-side surface of a lens located closest to the object to an image-side surface of a lens located closest to the image plane.

If the fT/LDT ratio were less than the lower limit of the condition expressed by the Inequality (13), then the distance measured at the telephoto end from an object-side surface of a lens located closest to the object to an image-side surface of a lens located closest to the image plane would increase too much with respect to the focal length at the telephoto end, thus causing a significant increase in the size of the zoom lens system. On the other hand, if the fT/LDT ratio were greater than the upper limit of the condition expressed by the Inequality (13), then the focal length would increase too much with respect to the distance measured at the telephoto end from an object-side surface of a lens located closest to the object to an image-side surface of a lens located closest to the image plane, thus reducing the size of the zoom lens system. Nevertheless, in that case, the absolute value of the power of each lens group would be too great to avoid producing various types of aberrations, e.g., spherical aberration, among other things, in each lens group. In that case, it would be difficult to compensate for various types of aberrations.

To enhance the advantage described above, the condition(s) expressed by one or both of the following Inequalities (13a) and (13b) is/are suitably satisfied:

$$0.80 < fT/LDT \tag{13a}$$

$$fT/LDT < 1.80 \tag{13b}$$

More suitably, to further enhance the advantage described above, the condition(s) expressed by one or both of the following Inequalities (13c) and (13d) is/are satisfied:

$$1.10 < fT/LDT \tag{13c}$$

$$fT/LDT < 1.77 \tag{13d}$$

Furthermore, the zoom lens system suitably satisfies the condition expressed by the following Inequality (14):

$$1.0 < fT/BFt < 6.0 \tag{14}$$

where fT is the focal length at the telephoto end and BFt is the back focus distance at the telephoto end.

The condition expressed by the Inequality (14) defines the ratio of the focal length at the telephoto end of the zoom lens system to the back focus (i.e., the distance from the image-side surface of a lens located closest to the image plane to the image plane).

If the fT/BFt ratio were less than the lower limit of the condition expressed by the Inequality (14), then the back focus would increase too much with respect to the focal length at the telephoto end, thus causing a significant increase in the size of the zoom lens system. On the other hand, if the fT/BFt ratio were greater than the upper limit of the condition expressed by the Inequality (14), then the back focus would decrease with respect to the focal length at the telephoto end, thus reducing the size of the zoom lens system. Nevertheless, in that case, the power of the $N^{th}$ lens group would be too great to easily compensate for various types of aberrations, e.g., field curvature, among other things.

To enhance the advantage described above, the condition(s) expressed by one or both of the following Inequalities (14a) and (14b) is/are suitably satisfied:

$$2.0 < fT/BFt \tag{14a}$$

$$fT/BFt < 5.5 \tag{14b}$$

More suitably, to further enhance the advantage described above, the condition(s) expressed by one or both of the following Inequalities (14c) and (14d) is/are satisfied:

$$3.0 < fT/BFt \tag{14c}$$

$$fT/BFt < 5.0 \tag{14d}$$

(Schematic configuration for image capture device to which first embodiment is applied)

Figure 16:
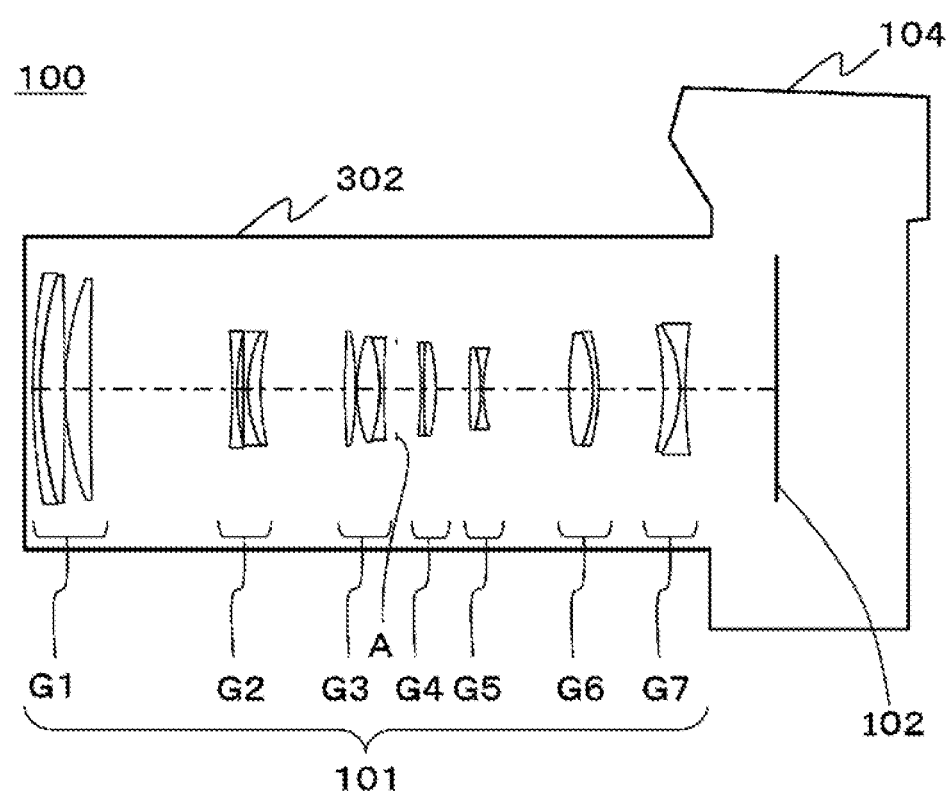
FIG. 16 illustrates a schematic configuration for an image capture device according to the first embodiment.

FIG. 16 illustrates a schematic configuration for an image capture device, to which the zoom lens system of the first embodiment is applied. Alternatively, the zoom lens system according to the second, third, fourth, or fifth embodiment is also applicable to the image capture device.

The image capture device 100 includes a housing 104, an image sensor 102, and the zoom lens system 101 according to the first embodiment. The image capture device 100 may be implemented as a digital camera, for example.

A lens barrel 302 holds the respective lens groups and the aperture stop A that form the zoom lens system 101.

The image sensor 102 is disposed at the image plane S of the zoom lens system according to the first embodiment.

The zoom lens system 101 is configured such that the first lens group G1, the third lens group G3, the fourth lens group G4, the fifth lens group G5, the sixth lens group G6, and the seventh lens group G7 are attached to, or engaged with, a lens frame included in the lens barrel 302 so as to move while the zoom lens system 101 is zooming. As used herein, if something is "engaged with" something else, these two things may be joined together either by hooking or fitting, whichever is appropriate.

The zoom lens system 101 is also configured such that the first lens group G1, the third lens group G3, the fourth lens group G4, the fifth lens group G5, the sixth lens group G6, and the seventh lens group G7 are attached to, or engaged with, the lens frame included in the lens barrel 302 so as to move along with the lens frame holding the first lens group G1, the third lens group G3, the fourth lens group G4, the fifth lens group G5, the sixth lens group G6, and the seventh lens group G7 while the zoom lens system 101 is zooming.

The zoom lens system 101 forms an optical image of the object. The image sensor 102 transforms the optical image of the object, formed by the zoom lens system 101, into an electrical image signal. That is to say, the image capture device 100 may store or output the optical image of the object as the electrical image signal.

This provides an image capture device with the ability to compensate for various types of aberrations sufficiently.

In the example described above, the zoom lens system according to the first embodiment is applied to a digital camera. However, this is only an example and should not be construed as limiting. Alternatively, the zoom lens system is also applicable to a surveillance camera, a smartphone, or any of various other types of image capture devices.

(Schematic configuration for camera system to which first embodiment is applied)

Figure 17:
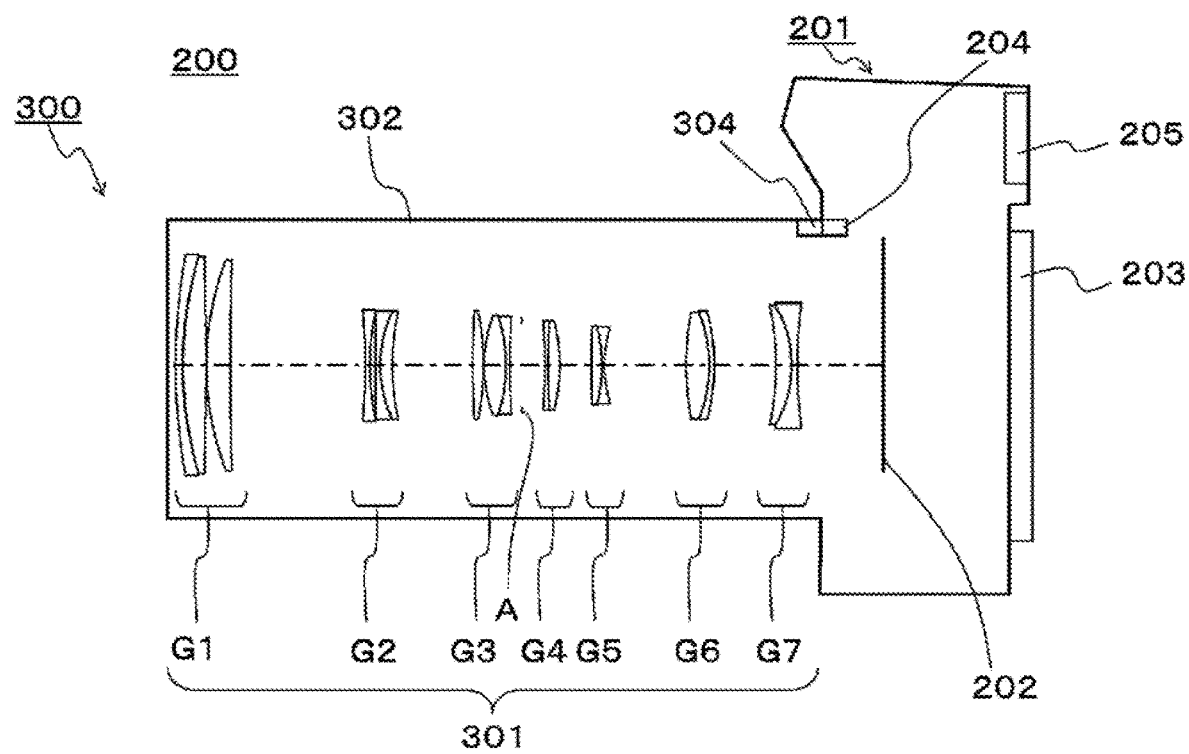
FIG. 17 illustrates a schematic configuration for a camera system according to the first embodiment.

FIG. 17 illustrates a schematic configuration for a camera system, to which the zoom lens system of the first embodiment is applied. Alternatively, the zoom lens system according to the second, third, fourth, or fifth embodiment is also applicable to the camera system.

The camera system 200 includes a camera body 201 and an interchangeable lens unit 300 to be connected removably to the camera body 201.

The camera body 201 includes an image sensor 202, a monitor 203, a memory, a camera mount 204, and a viewfinder 205. The image sensor 202 receives an optical image formed by the zoom lens system of the interchangeable lens unit 300 and transforms the optical image into an electrical image signal. The monitor 203 displays the image signal transformed by the image sensor 202. The memory stores the image signal.

The zoom lens system 301 of the interchangeable lens unit 300 is the zoom lens system according to the first embodiment.

The interchangeable lens unit 300 includes a lens barrel 302. The lens barrel 302 holds the respective lens groups and aperture stop A of the zoom lens system 301. The lens barrel 302 further includes a lens mount 304 to be connected to the camera mount 204 of the camera body 201.

The camera mount 204 and the lens mount 304 are physically connected together. In addition, the camera mount 204 and the lens mount 304 also electrically connect together a controller in the camera body 201 and a controller in the interchangeable lens unit 300. That is to say, the camera mount 204 and the lens mount 304 serve as interfaces that allow themselves to exchange signals with each other.

The zoom lens system 301 is configured such that the first lens group G1, the third lens group G3, the fourth lens group G4, the fifth lens group G5, the sixth lens group G6, and the seventh lens group G7 are attached to, or engaged with, a lens frame included in the lens barrel 302 so as to move while the zoom lens system 301 is zooming.

The zoom lens system 301 includes the respective lens groups held by the lens barrel 302. In addition, the zoom lens system 301 further includes an actuator, a lens frame, and other members to be controlled by the controller in the interchangeable lens unit 300 such that the fourth lens group G4 may move while the zoom lens system 301 is focusing.

Examples of Numerical Values

Next, exemplary sets of specific numerical values that were actually adopted in the zoom lens systems with the configurations according to the first, second, third, fourth, and fifth embodiments will be described. Note that in the tables showing these exemplary sets of numerical values, the length is expressed in millimeters (mm), the angle of view is expressed in degrees)(°, r indicates the radius of curvature, d indicates the surface interval, nd indicates a refractive index with respect to a d-line, νd (also denoted as "vd") indicates an abbe number with respect to a d-line, and a surface with an asterisk (*) is an aspheric surface. The aspheric shape is defined by the following equation.

$$Z = \frac{h^2/r}{1 + \sqrt{1-(1+\kappa)(h/r)^2}} + \sum A_n h^n$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 2, 5, 8, 11, and 14 are longitudinal aberration diagrams of the zoom lens systems according to the first, second, third, fourth, and fifth embodiments in the infinity in-focus state.

In each longitudinal aberration diagram, portion (a) shows the longitudinal aberrations at the wide-angle end, portion (b) shows the longitudinal aberrations at the middle position, and portion (c) shows the longitudinal aberrations at the telephoto end. Each of portions (a), (b) and (c) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

FIGS. 3, 6, 9 12, and 15 are five sets of lateral aberration diagrams at the telephoto end of the zoom lens systems according to the first, second, third, fourth, and fifth embodiments, respectively.

In each set of lateral aberration diagrams, the upper three aberration diagrams show characteristics in a basic state where no image blur compensation is performed at the telephoto end, while the lower three aberration diagrams show characteristics in an image blur compensated state at the telephoto end where the image blur compensation lens group has been shifted to a predetermined extent perpendicularly to the optical axis.

In the three lateral aberration diagrams showing the basic state, the upper diagram shows a characteristic with respect to the lateral aberration at an image point where the image height is 70% of the maximum image height, the middle diagram shows a characteristic with respect to the lateral aberration at an axial image point, and the lower diagram shows a characteristic with respect to the lateral aberration at an image point where the image height is −70% of the maximum image height. Likewise, in the three lateral aberration diagrams showing the image blur compensated state, the upper diagram shows a characteristic with respect to the lateral aberration at the image point where the image height is 70% of the maximum image height, the middle diagram shows a characteristic with respect to the lateral aberration at the axial image point, and the lower diagram shows a characteristic with respect to the lateral aberration at the image point where the image height is −70% of the maximum image height. In each lateral aberration diagram, the abscissa indicates the distance from a principal ray on the pupil, the solid curve indicates a characteristic in response to a d-line, the shorter dashed curve indicates a characteristic in response to an F-line, and the longer dashed curve indicates a characteristic in response to a C-line.

Following are the distances traveled, at the telephoto end, by the image blur compensation lens groups perpendicularly to the optical axis when the zoom lens systems according to the respective examples of numerical values are in the image blur compensated state.

| First example of numerical values | 0.551 mm |
| Second example of numerical values | 0.494 mm |
| Third example of numerical values | 0.549 mm |
| Fourth example of numerical values | 0.531 mm |
| Fifth example of numerical values | 0.688 mm |

Note that at the telephoto end with an infinite shooting distance, the image eccentricity when the zoom lens system has a tilt angle of 0.3 degrees is equal to the image eccentricity when the image blur compensation lens group translates by each of these values perpendicularly to the optical axis.

As is clear from the lateral aberration diagrams, the lateral aberration has a good degree of symmetry at the axial image point in this state. Also, comparing the lateral aberration at the image point where the image height is +70% of the maximum image height in the basic state with the lateral aberration at the image point where the image height is −70% of the maximum image height in the basic state, it can be seen that the degree of curvature is small, and the aberration curves have almost the same gradient. Thus, it can be seen that the eccentric coma aberration and eccentric astigmatism are both insignificant. These results reveal that sufficiently good imaging performance is achieved even in the image blur compensated state. Also, supposing the image blur compensation angle of the zoom lens system is the same, as the focal length of the entire zoom lens system becomes shorter, the degree of translation required for image blur compensation decreases. This enables making, at any zoom position, image blur compensation sufficiently with respect to an image blur compensation angle of about 0.4 degrees without causing a decline in the imaging performance.

First Example of Numerical Values

Following is a first exemplary set of numerical values for the zoom lens system corresponding to the first embodiment shown in FIG. 1. Specifically, as the first example of numerical values for the zoom lens system, surface data is shown in Table 1, aspheric surface data is shown in Table 2, and various types of data in the infinity in-focus state are shown in Tables 3A-3D:

TABLE 1

(Surface data)

| Surface No. | r | d | nd | vd |
|---|---|---|---|---|
| Object surface | ∞ | | | |
| 1 | 149.02930 | 1.70000 | 1.90366 | 31.3 |
| 2 | 90.22010 | 0.20000 | | |
| 3 | 94.69470 | 5.47000 | 1.49700 | 81.6 |
| 4 | −1397.90520 | 0.15000 | | |
| 5 | 71.45890 | 5.86000 | 1.43700 | 95.1 |
| 6 | 960.24800 | Variable | | |
| 7 | −150.73980 | 1.10000 | 1.58913 | 61.3 |
| 8 | 61.48450 | 1.53250 | | |
| 9 | 4030.47630 | 1.00000 | 1.59349 | 67.0 |
| 10 | 30.72580 | 0.01000 | 1.56732 | 42.8 |
| 11 | 30.72580 | 2.94000 | 1.84666 | 23.8 |
| 12 | 59.55230 | Variable | | |
| 13 | 219.44950 | 2.62000 | 1.87071 | 40.7 |
| 14 | −69.33020 | 0.20000 | | |
| 15 | 36.18720 | 5.29000 | 1.49700 | 81.6 |
| 16 | −38.66110 | 0.01000 | 1.56732 | 42.8 |
| 17 | −38.66110 | 1.00000 | 2.00100 | 29.1 |
| 18 | 262.05460 | 3.00000 | | |
| 19 (aperture) | ∞ | Variable | | |
| 20 | −127.35720 | 0.80000 | 1.84666 | 23.8 |
| 21 | 226.50870 | 0.01000 | 1.56732 | 42.8 |
| 22 | 226.50870 | 2.79000 | 1.80610 | 33.3 |
| 23 | −44.71840 | Variable | | |
| 24 | 342.14550 | 2.45000 | 1.86966 | 20.0 |
| 25 | −38.63930 | 0.01000 | 1.56732 | 42.8 |
| 26 | −38.63930 | 0.60000 | 1.80610 | 33.3 |
| 27 | 32.13490 | Variable | | |

TABLE 1-continued (Surface data)

| Surface No. | r | d | nd | vd |
|---|---|---|---|---|
| 28 | 67.74600 | 5.64000 | 1.65844 | 50.9 |
| 29 | −34.58950 | 0.01000 | 1.56732 | 42.8 |
| 30 | −34.58950 | 1.20000 | 1.92286 | 20.9 |
| 31 | −51.34110 | Variable | | |
| 32 | −69.64440 | 3.87000 | 1.85883 | 30.0 |
| 33 | −28.12860 | 0.01000 | 1.56732 | 42.8 |
| 34 | −28.12860 | 1.30000 | 1.80420 | 46.5 |
| 35 | 110.54230 | BF | | |
| Image plane | ∞ | | | |

(Table 2: Aspheric Surface Data)
No aspheric surface was existent.
(Various types of data in infinity in-focus state)

TABLE 3A (Various types of data)
Zoom ratio: 3.95600

| | Wide-Angle | Middle | Telephoto |
|---|---|---|---|
| Focal length | 72.8000 | 144.7974 | 287.9970 |
| F number | 4.54605 | 5.43172 | 5.85441 |
| Angle of view | 16.6501 | 8.3925 | 4.2458 |
| Image height | 21.6330 | 21.6330 | 21.6330 |
| Total lens length | 165.8343 | 195.6045 | 225.2331 |
| BF | 22.63464 | 43.83449 | 61.26739 |
| d6 | 3.2665 | 33.0367 | 62.7665 |
| d12 | 35.1758 | 19.5944 | 4.0000 |
| d19 | 9.6870 | 5.5015 | 4.7730 |
| d23 | 4.2909 | 7.8833 | 3.9453 |
| d27 | 11.3199 | 19.9125 | 36.7084 |
| d31 | 28.6871 | 15.0691 | 1.0000 |
| Entrance pupil position | 51.9122 | 112.2646 | 214.9917 |
| Exit pupil position | −36.6327 | −41.2413 | −56.0239 |
| Anterior principal point | 35.2896 | 10.6193 | −204.1591 |
| Posterior principal point | 93.0343 | 50.8070 | −62.7639 |

TABLE 3B (Data about single lens)

| Lens | Start surface | Focal length |
|---|---|---|
| 1 | 1 | −256.5229 |
| 2 | 3 | 178.6630 |
| 3 | 5 | 176.3143 |
| 4 | 7 | −73.9868 |
| 5 | 9 | −52.1737 |
| 6 | 11 | 71.6229 |
| 7 | 13 | 60.7655 |
| 8 | 15 | 38.5128 |
| 9 | 17 | −33.6010 |
| 10 | 20 | −96.1853 |
| 11 | 22 | 46.5423 |
| 12 | 24 | 40.0416 |
| 13 | 26 | −21.6822 |
| 14 | 28 | 35.5547 |
| 15 | 30 | −118.9628 |
| 16 | 32 | 52.6743 |
| 17 | 34 | −27.7663 |

TABLE 3C (Data about zoom lens group)

| Group | Start surface | Focal length | Lens configuration length | Anterior principal point | Posterior principal point |
|---|---|---|---|---|---|
| 1 | 1 | 137.03189 | 13.38000 | 3.35553 | 7.72474 |
| 2 | 7 | −50.90785 | 6.58250 | 2.32707 | 4.56460 |
| 3 | 13 | 65.82728 | 12.12000 | −3.07149 | 0.92123 |
| 4 | 20 | 87.40053 | 3.60000 | 3.12033 | 4.77791 |
| 5 | 24 | −48.11615 | 3.06000 | 1.88753 | 3.29028 |
| 6 | 28 | 50.80927 | 6.85000 | 2.37231 | 5.09281 |
| 7 | 32 | −56.00470 | 5.18000 | 0.91967 | 3.32429 |

TABLE 3D (Zoom power of zoom lens group)

| Group | Start surface | Wide-angle | Middle | Telephoto |
|---|---|---|---|---|
| 1 | 1 | 0.00000 | 0.00000 | 0.00000 |
| 2 | 7 | −0.67990 | −1.12865 | −3.31104 |
| 3 | 13 | −1.22321 | −1.07775 | −0.42039 |
| 4 | 20 | 0.41670 | 0.42770 | 0.54015 |
| 5 | 24 | 22.52294 | 7.19296 | 3.82494 |
| 6 | 28 | 0.04735 | 0.15551 | 0.34357 |
| 7 | 32 | 1.43729 | 1.81583 | 2.12710 |

Second Example of Numerical Values

Following is a second exemplary set of numerical values for the zoom lens system corresponding to the second embodiment shown in FIG. 4. Specifically, as the second example of numerical values for the zoom lens system, surface data is shown in Table 4, aspheric surface data is shown in Table 5, and various types of data in the infinity in-focus state are shown in Tables 6A-6D:

TABLE 4

(Surface data)

| Surface No. | r | d | nd | vd |
|---|---|---|---|---|
| Object surface | ∞ | | | |
| 1 | 188.89800 | 1.50000 | 1.90366 | 31.3 |
| 2 | 92.92790 | 0.20000 | | |
| 3 | 99.25230 | 4.35650 | 1.59283 | 68.6 |
| 4 | −1549.97450 | 0.15000 | | |
| 5 | 75.96170 | 4.48690 | 1.49700 | 81.6 |
| 6 | 719.60120 | Variable | | |
| 7 | −118.15420 | 1.10000 | 1.58913 | 61.3 |
| 8 | 64.20880 | 1.06110 | | |
| 9 | ∞ | 1.00000 | 1.59349 | 67.0 |
| 10 | 32.67990 | 0.01000 | 1.56732 | 42.8 |
| 11 | 32.67990 | 2.37060 | 1.84666 | 23.8 |
| 12 | 67.83490 | Variable | | |
| 13 | 297.10080 | 2.10440 | 1.87071 | 40.7 |
| 14 | −62.62100 | 0.20000 | | |
| 15 | 32.25440 | 3.92750 | 1.49700 | 81.6 |
| 16 | −44.02090 | 0.01000 | 1.56732 | 42.8 |
| 17 | −44.02090 | 1.00000 | 2.00100 | 29.1 |
| 18 | 279.78740 | 3.00000 | | |
| 19 (aperture) | ∞ | Variable | | |
| 20 | −762.08770 | 0.80000 | 1.84666 | 23.8 |
| 21 | 40.76730 | 0.01000 | 1.56732 | 42.8 |
| 22 | 40.76730 | 2.83380 | 1.80610 | 33.3 |
| 23 | −59.46970 | Variable | | |
| 24 | 984.43470 | 2.47550 | 1.86966 | 20.0 |
| 25 | −29.94080 | 0.01000 | 1.56732 | 42.8 |
| 26 | −29.94080 | 0.60000 | 1.80610 | 33.3 |
| 27 | 29.02160 | Variable | | |
| 28 | 59.68570 | 5.52900 | 1.65844 | 50.9 |

TABLE 4-continued (Surface data)

| Surface No. | r | d | nd | vd |
|---|---|---|---|---|
| 29 | −35.96280 | 0.01000 | 1.56732 | 42.8 |
| 30 | −35.96280 | 1.20000 | 1.92286 | 20.9 |
| 31 | −51.12000 | Variable | | |
| 32 | −66.84880 | 3.20580 | 1.85883 | 30.0 |
| 33 | −32.02100 | 0.01000 | 1.56732 | 42.8 |
| 34 | −32.02100 | 1.30000 | 1.80420 | 46.5 |
| 35 | 125.45650 | BF | | |
| Image plane | ∞ | | | |

(Table 5: Aspheric Surface Data)
No aspheric surface was existent.
(Various Types of Data in Infinity In-Focus State)

TABLE 6A (Various types of data)
Zoom ratio: 2.76922

| | Wide-Angle | Middle | Telephoto |
|---|---|---|---|
| Focal length | 72.8000 | 121.1461 | 201.5992 |
| F number | 4.65792 | 5.48858 | 5.90664 |
| Angle of view | 16.7488 | 10.0452 | 6.0901 |
| Image height | 21.6300 | 21.6300 | 21.6300 |
| Total lens length | 145.8293 | 170.8178 | 198.1246 |
| BF | 22.62963 | 38.74736 | 49.82147 |
| d6 | 3.2085 | 28.2116 | 55.5839 |
| d12 | 26.2876 | 15.4682 | 5.1335 |
| d19 | 9.5232 | 6.4236 | 3.4488 |
| d23 | 3.0829 | 4.2635 | 3.0829 |
| d27 | 13.0064 | 18.5212 | 31.2739 |
| d31 | 23.6300 | 14.7212 | 5.3190 |
| Entrance pupil position | 42.2852 | 85.0080 | 160.7959 |
| Exit pupil position | −36.9509 | −39.6824 | −51.0922 |
| Anterior principal point | 26.1327 | 19.0265 | −40.3478 |
| Posterior principal point | 73.0294 | 49.6717 | −3.4747 |

TABLE 6B (Data about single lens)

| Lens | Start surface | Focal length |
|---|---|---|
| 1 | 1 | −203.9236 |
| 2 | 3 | 157.5015 |
| 3 | 5 | 170.4849 |
| 4 | 7 | −70.4574 |
| 5 | 9 | −55.0637 |
| 6 | 11 | 72.2458 |
| 7 | 13 | 59.5621 |
| 8 | 15 | 38.1064 |
| 9 | 17 | −37.9396 |
| 10 | 20 | −45.6847 |
| 11 | 22 | 30.3882 |
| 12 | 24 | 33.4498 |
| 13 | 26 | −18.1992 |
| 14 | 28 | 34.8831 |
| 15 | 30 | −136.6196 |
| 16 | 32 | 68.6444 |
| 17 | 34 | −31.6047 |

TABLE 6C (Data about zoom lens group)

| Group | Start surface | Focal length | Lens configuration length | Anterior principal point | Posterior principal point |
|---|---|---|---|---|---|
| 1 | 1 | 137.61105 | 10.69340 | 2.80157 | 6.61027 |
| 2 | 7 | −52.19949 | 5.54170 | 1.75000 | 3.68782 |
| 3 | 13 | 54.12691 | 10.24190 | −1.28523 | 1.72671 |
| 4 | 20 | 86.95176 | 3.64380 | 2.33390 | 3.97741 |
| 5 | 24 | −40.47070 | 3.08550 | 1.75611 | 3.17606 |
| 6 | 28 | 46.96361 | 6.73900 | 2.21985 | 4.89195 |
| 7 | 32 | −56.47436 | 4.51580 | 0.72313 | 2.81139 |

TABLE 6D (Zoom power of zoom lens group)

| Group | Start surface | Wide-angle | Middle | Telephoto |
|---|---|---|---|---|
| 1 | 1 | 0.00000 | 0.00000 | 0.00000 |
| 2 | 7 | −0.68351 | −1.01621 | −2.17547 |
| 3 | 13 | −0.89307 | −0.80600 | −0.46131 |
| 4 | 20 | 0.51437 | 0.51933 | 0.57299 |
| 5 | 24 | 14.71872 | 9.27977 | 5.15739 |
| 6 | 28 | 0.08000 | 0.12995 | 0.25831 |
| 7 | 32 | 1.43089 | 1.71629 | 1.91238 |

Third Example of Numerical Values

Following is a third exemplary set of numerical values for the zoom lens system corresponding to the third embodiment shown in FIG. 7. Specifically, as the third example of numerical values for the zoom lens system, surface data is shown in Table 7, aspheric surface data is shown in Table 8, and various types of data in the infinity in-focus state are shown in Tables 9A-9D:

TABLE 7

(Surface data)

| Surface No. | r | d | nd | vd |
|---|---|---|---|---|
| Object surface | ∞ | | | |
| 1 | 301.91110 | 1.50000 | 1.90366 | 31.3 |
| 2 | 136.33490 | 0.20000 | | |
| 3 | 148.35010 | 4.69540 | 1.49700 | 81.6 |
| 4 | −290.77250 | 0.15000 | | |
| 5 | 68.89210 | 5.07390 | 1.43700 | 95.1 |
| 6 | 387.89320 | Variable | | |
| 7 | −116.24990 | 1.10000 | 1.58913 | 61.3 |
| 8 | 79.16380 | 1.20100 | | |
| 9 | ∞ | 1.00000 | 1.59349 | 67.0 |
| 10 | 39.44880 | 0.01000 | 1.56732 | 42.8 |
| 11 | 39.44880 | 2.54580 | 1.84666 | 23.8 |
| 12 | 84.32680 | Variable | | |
| 13 | 163.92360 | 2.11330 | 1.87071 | 40.7 |
| 14 | −77.23660 | 0.20000 | | |
| 15 | 30.65130 | 4.25270 | 1.49700 | 81.6 |
| 16 | −43.95990 | 0.01000 | 1.56732 | 42.8 |
| 17 | −43.95990 | 1.00000 | 2.00100 | 29.1 |
| 18 | 122.19240 | 2.00000 | | |
| 19 (aperture) | ∞ | 4.48710 | | |
| 20 | 772.62170 | 0.80000 | 1.85344 | 26.5 |
| 21 | 42.60490 | 0.01000 | 1.56732 | 42.8 |
| 22 | 42.60490 | 2.84500 | 1.80610 | 33.3 |
| 23 | −58.66410 | Variable | | |
| 24 | 5192.84510 | 2.59660 | 1.86966 | 20.0 |
| 25 | −25.81430 | 0.01000 | 1.56732 | 42.8 |
| 26 | −25.81430 | 0.60000 | 1.80610 | 33.3 |
| 27 | 27.88010 | Variable | | |
| 28 | 60.95740 | 6.25970 | 1.65763 | 55.4 |

TABLE 7-continued (Surface data)

| Surface No. | r | d | nd | vd |
|---|---|---|---|---|
| 29 | −33.47660 | 0.01000 | 1.56732 | 42.8 |
| 30 | −33.47660 | 1.20000 | 1.88100 | 20.9 |
| 31 | −51.12000 | Variable | | |
| 32 | −86.96120 | 3.65300 | 1.85883 | 30.0 |
| 33 | −32.92990 | 0.01000 | 1.56732 | 42.8 |
| 34 | −32.92990 | 1.30000 | 1.80420 | 46.5 |
| 35 | 99.11010 | BF | | |
| Image plane | ∞ | | | |

(Table 8: Aspheric Surface Data)
No aspheric surface was existent.
(Various Types of Data in Infinity In-Focus State)

TABLE 9A (Various types of data)
Zoom ratio: 2.63735

| | Wide-Angle | Middle | Telephoto |
|---|---|---|---|
| Focal length | 72.8006 | 118.2279 | 192.0006 |
| F number | 4.65781 | 5.60005 | 6.05430 |
| Angle of view | 17.0656 | 10.3923 | 6.3624 |
| Image height | 21.6330 | 21.6330 | 21.6330 |
| Total lens length | 161.6754 | 182.3301 | 212.2344 |
| BF | 22.63496 | 41.59907 | 58.45678 |
| d6 | 5.6338 | 26.3132 | 56.2931 |
| d12 | 37.7638 | 21.7946 | 13.8870 |
| d23 | 7.0000 | 4.2009 | 2.0000 |
| d27 | 16.4128 | 19.9047 | 22.3569 |
| d31 | 21.3965 | 17.6841 | 8.4071 |
| Entrance pupil position | 55.1994 | 85.9895 | 172.5340 |
| Exit pupil position | −39.9748 | −41.5490 | −41.8183 |
| Anterior principal point | 43.3499 | 36.1097 | −3.0964 |
| Posterior principal point | 88.8748 | 64.1022 | 20.2338 |

TABLE 9B

Data about single lens

| Lens | Start surface | Focal length |
|---|---|---|
| 1 | 1 | −276.2840 |
| 2 | 3 | 198.3562 |
| 3 | 5 | 190.7701 |
| 4 | 7 | −79.7717 |
| 5 | 9 | −66.4689 |
| 6 | 11 | 85.3305 |
| 7 | 13 | 60.5429 |
| 8 | 15 | 37.0377 |
| 9 | 17 | −32.1998 |
| 10 | 20 | −52.8614 |
| 11 | 22 | 31.0061 |
| 12 | 24 | 29.5431 |
| 13 | 26 | −16.5454 |
| 14 | 28 | 33.7465 |
| 15 | 30 | −113.7187 |
| 16 | 32 | 59.8415 |
| 17 | 34 | −30.6012 |

TABLE 9C

Data about zoom lens group

| Group | Start surface | Focal length | Lens configuration length | Anterior principal point | Posterior principal point |
|---|---|---|---|---|---|
| 1 | 1 | 149.79994 | 11.61930 | 3.54041 | 7.36150 |
| 2 | 7 | −61.21198 | 5.85680 | 1.71537 | 3.73187 |
| 3 | 13 | 39.29411 | 17.71810 | 5.30497 | 8.23917 |
| 4 | 24 | −38.09673 | 3.20660 | 1.77330 | 3.25163 |
| 5 | 28 | 47.91376 | 7.46970 | 2.45345 | 5.37945 |
| 6 | 32 | −60.59025 | 4.96300 | 1.12754 | 3.42938 |

TABLE 9D

Zoom power of zoom lens group

| Group | Start surface | Wide-angle | Middle | Telephoto |
|---|---|---|---|---|
| 1 | 1 | 0.00000 | 0.00000 | 0.00000 |
| 2 | 7 | −0.79516 | −1.08722 | −2.32553 |
| 3 | 13 | −0.33937 | −0.33387 | −0.21173 |
| 4 | 24 | 10.24234 | 33.51652 | 10.19968 |
| 5 | 28 | 0.12569 | 0.03790 | 0.12824 |
| 6 | 32 | 1.39889 | 1.71188 | 1.99010 |

Fourth Example of Numerical Values

Following is a fourth exemplary set of numerical values for the zoom lens system corresponding to the fourth embodiment shown in FIG. 10. Specifically, as the fourth example of numerical values for the zoom lens system, surface data is shown in Table 10, aspheric surface data is shown in Table 11, and various types of data in the infinity in-focus state are shown in Tables 12A-12D:

TABLE 10

Surface data

| Surface No. | r | d | nd | vd |
|---|---|---|---|---|
| Object surface | ∞ | | | |
| 1 | 161.03340 | 2.10000 | 1.80420 | 46.5 |
| 2 | 69.08230 | 7.41770 | 1.43700 | 95.1 |
| 3 | −539.12550 | 0.20000 | | |
| 4 | 62.97530 | 6.57200 | 1.43700 | 95.1 |
| 5 | 1792.90660 | Variable | | |
| 6 | 171.92370 | 1.00000 | 1.60311 | 60.7 |
| 7 | 46.27560 | 3.70000 | | |
| 8 | −56.93060 | 1.00000 | 1.43700 | 95.1 |
| 9 | 36.31660 | 2.55000 | 1.84666 | 23.8 |
| 10 | 56.95310 | Variable | | |
| 11 (aperture) | ∞ | 1.00000 | | |
| 12 | 196.55100 | 3.50000 | 1.90043 | 37.4 |
| 13 | −59.61910 | 0.15000 | | |
| 14 | 37.06690 | 5.50460 | 1.43700 | 95.1 |
| 15 | −37.06690 | 0.90000 | 2.00100 | 29.1 |
| 16 | −679.03480 | Variable | | |
| 17 | −100.98370 | 1.00000 | 1.75520 | 27.5 |
| 18 | 290.52120 | 6.07020 | | |
| 19 | 211.48320 | 3.00000 | 1.77250 | 49.6 |
| 20 | −49.48270 | Variable | | |
| 21 | 164.49640 | 2.50000 | 1.84666 | 23.8 |
| 22 | −56.24940 | 0.80000 | 1.80420 | 46.5 |
| 23 | 30.88460 | Variable | | |

TABLE 10-continued

Surface data

| Surface No. | r | d | nd | vd |
|---|---|---|---|---|
| 24 | 68.77180 | 7.18000 | 1.48749 | 70.4 |
| 25 | −25.63210 | 0.80000 | 1.84666 | 23.8 |
| 26 | −34.13590 | Variable | | |
| 27 | −50.79320 | 3.78690 | 1.85883 | 30.0 |
| 28 | −27.38360 | 1.30000 | 1.72916 | 54.7 |
| 29 | 125.90560 | BF | | |
| Image plane | ∞ | | | |

(Table 11: Aspheric Surface Data)
No aspheric surface was existent.
(Various Types of Data in Infinity In-Focus State)

TABLE 12A

Various types of data
Zoom ratio: 4.08355

| | Wide-Angle | Middle | Telephoto |
|---|---|---|---|
| Focal length | 71.7497 | 149.9985 | 292.9931 |
| F number | 4.10186 | 5.30852 | 5.85256 |
| Angle of view | 16.9066 | 8.0760 | 4.1596 |
| Image height | 21.6300 | 21.6300 | 21.6300 |
| Total lens length | 166.5192 | 199.4960 | 228.0878 |
| BF | 16.72927 | 39.65796 | 59.22028 |
| d5 | 4.0000 | 36.9777 | 65.5719 |
| d10 | 26.7423 | 14.3995 | 2.5000 |
| d16 | 6.7865 | 2.9348 | 2.9011 |
| d20 | 2.0000 | 6.0636 | 2.0000 |
| d23 | 14.8856 | 20.9786 | 31.8631 |
| d26 | 33.3441 | 16.4524 | 2.0000 |
| Entrance pupil position | 45.8883 | 106.7616 | 189.6310 |
| Exit pupil position | −43.7691 | −46.6244 | −54.7389 |
| Anterior principal point | 32.5445 | −4.0066 | −270.6714 |
| Posterior principal point | 94.7695 | 49.4974 | −64.9053 |

TABLE 12B

Data about single lens

| Lens | Start surface | Focal length |
|---|---|---|
| 1 | 1 | −151.9870 |
| 2 | 2 | 140.6484 |
| 3 | 4 | 149.1812 |
| 4 | 6 | −105.3021 |
| 5 | 8 | −50.5729 |
| 6 | 9 | 112.0322 |
| 7 | 12 | 51.1332 |
| 8 | 14 | 43.3902 |
| 9 | 15 | −39.1953 |
| 10 | 17 | −99.1181 |
| 11 | 19 | 52.1709 |
| 12 | 21 | 49.7659 |
| 13 | 22 | −24.6908 |
| 14 | 24 | 39.2827 |
| 15 | 25 | −127.0047 |
| 16 | 27 | 64.3711 |
| 17 | 28 | −30.7362 |

TABLE 12C

Data about zoom lens group

| Group | Start surface | Focal length | Lens configuration length | Anterior principal point | Posterior principal point |
|---|---|---|---|---|---|
| 1 | 1 | 139.06568 | 16.28970 | 5.81447 | 10.95300 |
| 2 | 6 | −46.97375 | 8.25000 | 3.75629 | 5.76704 |
| 3 | 11 | 51.92657 | 11.05460 | −0.31478 | 3.83558 |
| 4 | 17 | 94.33140 | 10.07020 | 14.37857 | 17.23857 |
| 5 | 21 | −50.26976 | 3.30000 | 2.30051 | 3.78172 |
| 6 | 24 | 56.88724 | 7.98000 | 3.61544 | 6.19239 |
| 7 | 27 | −55.39231 | 5.08690 | 0.35802 | 2.67868 |

TABLE 12D

Zoom power of zoom lens group

| Group | Start surface | Wide-angle | Middle | Telephoto |
|---|---|---|---|---|
| 1 | 1 | 0.00000 | 0.00000 | 0.00000 |
| 2 | 6 | −0.59461 | −1.02070 | −2.69545 |
| 3 | 11 | −1.00073 | −0.87182 | −0.41104 |
| 4 | 17 | 0.55542 | 0.56487 | 0.65919 |
| 5 | 21 | 9.20022 | 4.82474 | 3.29586 |
| 6 | 24 | 0.12611 | 0.25278 | 0.41432 |
| 7 | 27 | 1.34549 | 1.75942 | 2.11258 |

Fifth Example of Numerical Values

Following is a fifth exemplary set of numerical values for the zoom lens system corresponding to the fifth embodiment shown in FIG. 13. Specifically, as the fifth example of numerical values for the zoom lens system, surface data is shown in Table 13, aspheric surface data is shown in Table 14, and various types of data in the infinity in-focus state are shown in Tables 15A-15D:

TABLE 13

Surface data

| Surface No. | r | d | nd | vd |
|---|---|---|---|---|
| Object surface | ∞ | | | |
| 1 | 157.00760 | 3.00000 | 1.90043 | 37.4 |
| 2 | 85.00620 | 8.81590 | 1.49700 | 81.6 |
| 3 | 647.67240 | 0.28570 | | |
| 4 | 86.10380 | 8.55060 | 1.49700 | 81.6 |
| 5 | 9477.89080 | Variable | | |
| 6 | −335.03150 | 1.42860 | 1.48749 | 70.4 |
| 7 | 70.20500 | 3.70620 | | |
| 8 | −197.39820 | 1.42860 | 1.48749 | 70.4 |
| 9 | 49.32600 | 3.70220 | 1.84666 | 23.8 |
| 10 | 78.60410 | Variable | | |
| 11 (aperture) | ∞ | 1.42860 | | |
| 12 | 208.47360 | 4.74790 | 1.91082 | 35.2 |
| 13 | −92.99870 | 0.21430 | | |
| 14 | 56.14750 | 7.00100 | 1.43700 | 95.1 |
| 15 | −56.14750 | 0.90000 | 2.00100 | 29.1 |
| 16 | −1971.72670 | Variable | | |
| 17 | −213.28570 | 1.42860 | 1.74077 | 27.8 |
| 18 | 200.86010 | 9.00000 | | |
| 19 | 185.61550 | 3.88620 | 1.72916 | 54.7 |
| 20 | −73.69110 | Variable | | |
| 21 | 1658.54610 | 3.00000 | 1.84666 | 23.8 |
| 22 | −61.28980 | 0.80000 | 1.72916 | 54.7 |
| 23 | 134.93630 | 0.80000 | 1.87071 | 40.7 |
| 24 | 43.99310 | Variable | | |
| 25 | 80.36650 | 5.00000 | 1.48749 | 70.4 |
| 26 | −38.94890 | 1.14290 | 1.84666 | 23.8 |
| 27 | −53.81720 | Variable | | |

TABLE 13-continued

Surface data

| Surface No. | r | d | nd | vd |
|---|---|---|---|---|
| 28 | −79.30840 | 3.29590 | 1.85883 | 30.0 |
| 29 | −39.81880 | 1.20000 | 1.72916 | 54.7 |
| 30 | 224.64870 | BF | | |
| Image plane | ∞ | | | |

(Table 14: Aspheric Surface Data)
No aspheric surface was existent.
(Various Types of Data in Infinity In-Focus State)

TABLE 15A

Various types of data
Zoom ratio: 3.80486

| | Wide-Angle | Middle | Telephoto |
|---|---|---|---|
| Focal length | 102.5002 | 199.9999 | 389.9983 |
| F number | 4.09951 | 5.30329 | 5.87210 |
| Angle of view | 12.0879 | 6.1702 | 3.1648 |
| Image height | 21.6330 | 21.6330 | 21.6330 |
| Total lens length | 235.4476 | 262.8697 | 302.5516 |
| BF | 19.91983 | 57.70275 | 82.14551 |
| d5 | 2.0000 | 29.4223 | 69.1048 |
| d10 | 41.3982 | 17.9428 | 3.1963 |
| d16 | 10.9761 | 7.0589 | 9.5364 |
| d20 | 2.7867 | 8.2796 | 2.0000 |
| d24 | 26.3770 | 36.9782 | 59.8054 |
| d27 | 57.2266 | 30.7220 | 2.0000 |
| Entrance pupil position | 60.0603 | 93.6001 | 186.3997 |
| Exit pupil position | −70.4735 | −78.9594 | −107.5737 |
| Anterior principal point | 46.3320 | 0.9076 | −225.3062 |
| Posterior principal point | 132.9475 | 62.8698 | −87.4467 |

TABLE 15B

Data about single lens

| Lens | Start surface | Focal length |
|---|---|---|
| 1 | 1 | −210.0099 |
| 2 | 2 | 195.8610 |
| 3 | 4 | 174.7835 |
| 4 | 6 | −118.9264 |
| 5 | 8 | −80.8014 |
| 6 | 9 | 147.8400 |
| 7 | 12 | 71.1409 |
| 8 | 14 | 65.4832 |

TABLE 15B-continued

Data about single lens

| Lens | Start surface | Focal length |
|---|---|---|
| 9 | 15 | −57.7489 |
| 10 | 17 | −139.4374 |
| 11 | 19 | 72.8025 |
| 12 | 21 | 69.8659 |
| 13 | 22 | −57.7021 |
| 14 | 23 | −75.2755 |
| 15 | 25 | 54.5650 |
| 16 | 26 | −172.5941 |
| 17 | 28 | 89.6567 |
| 18 | 29 | −46.2985 |

TABLE 15C

Data about zoom lens group

| Group | Start surface | Focal length | Lens configuration length | Anterior principal point | Posterior principal point |
|---|---|---|---|---|---|
| 1 | 1 | 169.18563 | 20.65220 | 5.25731 | 12.31896 |
| 2 | 6 | −68.16109 | 10.26560 | 4.03070 | 6.86924 |
| 3 | 11 | 74.99863 | 14.29180 | −0.41004 | 4.87634 |
| 4 | 17 | 130.73034 | 14.31480 | 20.20407 | 24.00056 |
| 5 | 21 | −61.53532 | 4.60000 | 2.73203 | 4.81149 |
| 6 | 25 | 80.17627 | 6.14290 | 2.55945 | 4.65541 |
| 7 | 28 | −92.29407 | 4.49590 | 0.20492 | 2.24275 |

TABLE 15D

Zoom power of zoom lens group

| Group | Start surface | Wide-angle | Middle | Telephoto |
|---|---|---|---|---|
| 1 | 1 | 0.00000 | 0.00000 | 0.00000 |
| 2 | 6 | −0.78653 | −1.15063 | −3.48547 |
| 3 | 11 | −0.82274 | −0.81063 | −0.31656 |
| 4 | 17 | 0.57632 | 0.56877 | 0.68692 |
| 5 | 21 | 31.07664 | 9.48640 | 3.93143 |
| 6 | 25 | 0.04215 | 0.14239 | 0.40410 |
| 7 | 28 | 1.24024 | 1.64962 | 1.91445 |

(Values Corresponding to Inequalities)

Values, corresponding to the Inequalities (1) to (14), of the respective examples of numerical values are shown in the following Table 16:

TABLE 16

| Numerical values or conditional values | | $1^{st}$ example of numerical values | $2^{nd}$ example of numerical values | $3^{rd}$ example of numerical values | $4^{th}$ example of numerical values | $5^{th}$ example of numerical values |
|---|---|---|---|---|---|---|
| BFw | | 22.63464 | 22.62963 | 22.63496 | 16.72927 | 19.91983 |
| BFt | | 61.26739 | 49.82147 | 58.45678 | 59.22028 | 82.14551 |
| fT | | 287.9970 | 201.5992 | 192.0006 | 292.9931 | 389.9983 |
| vd1 | Lens L2 | 81.6 | 68.6 | 81.6 | 95.1 | 81.6 |
| | Lens L3 | 95.1 | 81.6 | 95.1 | 95.1 | 81.6 |
| DT | | 36.7084 | 31.2739 | 22.3569 | 31.8631 | 59.8054 |
| LT | | 225.2331 | 198.1246 | 212.2344 | 228.0878 | 302.5516 |
| LDT | | 163.9657 | 148.3031 | 153.7776 | 168.8675 | 220.4061 |
| vLG3p | | 81.6 | 81.6 | 81.6 | 95.1 | 95.1 |
| $\beta T_{Gf}$ | | 3.82494 | 5.15739 | 10.19968 | 3.29586 | 3.93143 |
| $\beta T_{GRR}$ | | 0.73081 | 0.49399 | 0.25521 | 0.87528 | 0.77363 |
| $\beta T_{G2}$ | | −3.31104 | −2.17547 | −2.32553 | −2.69545 | −3.48547 |
| $\beta T_{GR}$ | | −0.63474 | −0.67342 | −0.55115 | −0.78165 | −0.66137 |
| fGNLn | | −27.76630 | −31.60470 | −30.60120 | −30.73620 | −46.29850 |
| LW | | 165.8343 | 145.8293 | 161.6754 | 166.5192 | 235.4476 |
| R_GNc | | −28.12860 | −32.02100 | −32.92990 | −27.38360 | −39.81880 |

TABLE 16-continued

| Numerical values or conditional values | | 1st example of numerical values | 2nd example of numerical values | 3rd example of numerical values | 4th example of numerical values | 5th example of numerical values |
|---|---|---|---|---|---|---|
| $fG_{N-1}$ | | 50.80927 | 46.96361 | 47.91376 | 56.88724 | 80.17627 |
| fGN | | −56.00470 | −56.47436 | −60.59025 | −55.39231 | −92.29407 |
| nLG3n | | 2.001 | 2.001 | 2.001 | 2.001 | 2.001 |
| vLG3n | | 29.1 | 29.1 | 29.1 | 29.1 | 29.1 |
| Inequality (1) | | 0.0786 | 0.1123 | 0.1179 | 0.0571 | 0.0511 |
| Inequality (2) | Lens L2 | 81.6 | 68.6 | 81.6 | 95.1 | 81.6 |
| | Lens L3 | 95.1 | 81.6 | 95.1 | 95.1 | 81.6 |
| Inequality (3) | | 0.1630 | 0.1578 | 0.1053 | 0.1397 | 0.1977 |
| Inequality (4) | | 81.6 | 81.6 | 81.6 | 95.1 | 95.1 |
| Inequality (5) | | −7.27964 | −6.24674 | −6.71079 | −7.55596 | −8.65205 |
| Inequality (6) | | −2.73639 | −2.13843 | −1.83287 | −2.88855 | −2.96656 |
| Inequality (7) | | −0.16743 | −0.21672 | −0.18928 | −0.18458 | −0.19664 |
| Inequality (8) | | 0.50225 | 0.56700 | 0.54349 | 0.49436 | 0.43143 |
| Inequality (9) | | −0.90723 | −0.83159 | −0.79078 | −1.02699 | −0.86870 |
| Inequality (10) | | 2.001 | 2.001 | 2.001 | 2.001 | 2.001 |
| Inequality (11) | | 29.1 | 29.1 | 29.1 | 29.1 | 29.1 |
| Inequality (12) | | 1.279 | 1.018 | 0.905 | 1.285 | 1.289 |
| Inequality (13) | | 1.756 | 1.359 | 1.249 | 1.735 | 1.769 |
| Inequality (14) | | 4.701 | 4.046 | 3.284 | 4.948 | 4.748 |

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The zoom lens system according to the present disclosure is applicable to various types of cameras including digital still cameras, digital cameras, of which the lens is interchangeable, digital camcorders, cameras for cellphones and smartphones, and cameras for personal digital assistants (PDAs), surveillance cameras for surveillance systems, Web cameras, and onboard cameras. Among other things, the present disclosure is particularly suitably applicable as a zoom lens system for digital still camera systems, digital camcorder systems, and other camera systems that require high image quality.

The invention claimed is:

1. A zoom lens system comprising at least six lens groups, each of the at least six lens groups having power,
an interval between each pair of lens groups that are adjacent to each other among the at least six lens groups changing while the zoom lens system is zooming,
each of three lens groups, which are respectively located closest, second closest, and third closest to an image plane, out of the at least six lens groups consisting of one or more bonded lenses.

2. The zoom lens system of claim 1, wherein another lens group, which is located fourth closest to the image plane, out of the at least six lens groups also consists of one or more bonded lenses.

3. The zoom lens system of claim 1, wherein each of the three lens groups consists of a single bonded lens.

4. The zoom lens system of claim 1, wherein a second lens group, which is located second closest to an object, out of the at least six lens groups does not move while the zoom lens system is zooming.

5. The zoom lens system of claim 1, wherein an $N^{th}$ lens group, which is located closer to the image plane than any other lens group of the at least six lens groups, includes a negative lens GNLn, and
the zoom lens system satisfies a condition expressed by the following inequality:

$$-0.3 < fGNLn/LW < 0$$

where fGNLn is a focal length of the negative lens GNLn and LW is a total lens length at a wide-angle end.

6. The zoom lens system of claim 1, wherein the zoom lens system satisfies a condition expressed by the following inequality:

$$0.3 < R\_GN_c/fG_N < 0.7$$

where $R\_GN_c$ is a radius of curvature of a bonded face of a bonded lens that forms part of an $N^{th}$ lens group located closer to the image plane than any other lens group of the at least six lens groups, and $fG_N$ is a focal length of the $N^{th}$ lens group.

7. The zoom lens system of claim 1, wherein when a lens group located closer to the image plane than any other lens group of the at least six lens groups is called an $N^{th}$ lens group, another lens group located adjacent to, and closer to an object than, the $N^{th}$ lens group is called an $(N-1)^{th}$ lens group, and still another lens group located adjacent to, and closer to the object than, the $(N-1)^{th}$ lens group is called an $(N-2)^{th}$ lens group,
while the zoom lens system is focusing to make a transition from an infinity in-focus state toward a close-object in-focus state, at least the $(N-2)^{th}$ lens group moves along an optical axis of the zoom lens system, and
the zoom lens system satisfies a condition expressed by the following inequality:

$$-1.5 < fG_{N-1}/fG_N < -0.5$$

where $fG_{N-1}$ is a focal length of the $(N-1)^{th}$ lens group and $fG_N$ is a focal length of the $N^{th}$ lens group.

8. The zoom lens system of claim 1, wherein when a negative lens, having the largest refractive index with respect to a d-line out of at least one negative lens that forms a third lens group, which is located third closest to an object out of the at least six lens groups, is a negative lens LG3n, the zoom lens system satisfies a condition expressed by the following inequality, $nLG3n > 1.95$ where nLG3n is a refractive index of the negative lens LG3n with respect to the d-line.

9. The zoom lens system of claim 1, wherein
when a negative lens, having the smallest Abbe number with respect to a d-line out of at least one negative lens that forms a third lens group, which is located third closest to an object out of the at least six lens groups, is a negative lens LG3n, the zoom lens system satisfies a condition expressed by the following inequality, $vLG3n < 35.0$ where vLG3n is an Abbe number of the negative lens LG3n with respect to the d-line.

10. The zoom lens system of claim 1, wherein the zoom lens system satisfies a condition expressed by the following inequality:

$0.2 < fT/LT < 1.5$ where fT is a focal length at a telephoto end and LT is a total lens length at the telephoto end.

11. The zoom lens system of claim 1, wherein the zoom lens system satisfies a condition expressed by the following inequality:

$0.50 < fT/LDT < 1.85$ where fT is a focal length at a telephoto end and LDT is a distance measured at the telephoto end along an optical axis of the zoom lens system from an object-side surface of a lens located closer to the object than any other lens of the zoom lens system to an image-side surface of a lens located closer to the image plane than any other lens of the zoom lens system.

12. An image capture device configured to transform an optical image of an object into an electrical image signal and output the electrical image signal thus transformed, the image capture device comprising:
a zoom lens system configured to form the optical image of the object; and
an image sensor configured to transform the optical image formed by the zoom lens system into the electrical image signal,
the zoom lens system comprising at least six lens groups, each of the at least six lens groups having power,
an interval between each pair of lens groups that are adjacent to each other among the at least six lens groups changing while the zoom lens system is zooming,
each of three lens groups, which are respectively located closest, second closest, and third closest to an image plane, out of the at least six lens groups consisting of one or more bonded lenses.

13. An interchangeable lens unit configured to be removably connected, via a mount, to a camera body, the camera body including: an image sensor configured to receive an optical image and transform the optical image into an electrical image signal; and the mount,
the interchangeable lens unit comprising at least six lens groups, each of the at least six lens groups having power,
an interval between each pair of lens groups that are adjacent to each other among the at least six lens groups changing while the interchangeable lens unit is zooming,
each of three lens groups, which are respectively located closest, second closest, and third closest to an image plane, out of the at least six lens groups consisting of one or more bonded lenses.

* * * * *